(12) United States Patent
Hatakeyama et al.

(10) Patent No.: US 7,016,124 B2
(45) Date of Patent: Mar. 21, 2006

(54) IMAGE-FORMATION OPTICAL SYSTEM AND OPTICAL APPARATUS

(75) Inventors: Koshi Hatakeyama, Tochigi (JP); Toshihiro Sunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 10/859,805

(22) Filed: Jun. 3, 2004

(65) Prior Publication Data

US 2004/0264006 A1 Dec. 30, 2004

(30) Foreign Application Priority Data

Jun. 30, 2003 (JP) .............................. 2003-187718

(51) Int. Cl.
*G02B 17/00* (2006.01)
(52) U.S. Cl. ..................... 359/729; 359/727; 359/731
(58) Field of Classification Search ................ 359/726, 359/727, 729, 731
See application file for complete search history.

(56) References Cited

U.S. PATENT DOCUMENTS

| | | | |
|---|---|---|---|
| 4,265,510 A | | 5/1981 | Cook |
| 6,124,986 A | * | 9/2000 | Sekita et al. ................ 359/691 |
| 6,278,554 B1 | * | 8/2001 | Aratani et al. .............. 359/631 |
| 6,626,541 B1 | | 9/2003 | Sunaga |
| 2002/0159158 A1 | | 10/2002 | Nagata |

FOREIGN PATENT DOCUMENTS

| | | |
|---|---|---|
| EP | 1 139 145 A2 | 10/2001 |
| JP | 8-292371 | 11/1996 |
| JP | 8-292372 | 11/1996 |
| JP | 09-005650 | 1/1997 |
| JP | 09-222561 | 8/1997 |
| JP | 01-282451 | 10/1998 |
| JP | 2000-089227 | 3/2000 |
| JP | 2001-255462 | 9/2001 |

OTHER PUBLICATIONS

Communication from European Patent Office dated Aug. 5, 2004 for Appl. No. 04253323.2-2217-.

* cited by examiner

*Primary Examiner*—Scott J. Sugarman
(74) *Attorney, Agent, or Firm*—Morgan & Finnegan, L.L.P.

(57) ABSTRACT

An image-formation optical system is disclosed which is an off-axial optical system configured using reflective surfaces, with which the performance deterioration with respect to manufacturing discrepancies is reduced, and which can be made sufficiently compact. The image-formation optical system comprises a reflective optical unit including a plurality of reflective surfaces. Each of the reflective surfaces has a curvature and a rotationally asymmetric shape. Moreover, $L/\{Er(S-1)\}$ is smaller than 2.2 and $L/\{Eo(S-1)\}$ is larger than 3.

8 Claims, 26 Drawing Sheets

IMAGE-FORMATION OPTICAL SYSTEM AND OPTICAL APPARATUS

BACKGROUND OF THE INVENTION

1. Field of the Invention

The present invention relates to an image-formation optical system used in optical apparatuses, such as image projection apparatuses or image-taking apparatuses.

2. Description of Related Art

In recent years, in order to enlarge and display images created with a computer, image projection apparatuses, such as front projection-type projectors (front projectors), have come to be widely used. In such image projection apparatuses, smaller size and lighter weight is of course desired, and they often use projection optical systems which can project obliquely onto a screen in order to perform image projection without obstructing the visual field of the observer. Since with oblique projection the image projected onto the screen is distorted by so-called trapezoidal distortion, methods for correcting this trapezoidal distortion have been proposed for example in Japanese Patent Application Laid Open No. H10 (1998)-282451.

On the other hand, regarding non-coaxial optical systems, Japanese Patent Application Laid Open No. H09, (1997)-5650 discloses a method for designing a non-coaxial optical system and a method for calculating paraxial quantities such as the focal length, and Japanese Patent Application Laid Open No. H08 (1996)-292371, Japanese Patent Application Laid Open No. H08 (1996)-292372, and Japanese Patent Application Laid Open No. H09 (1997)-222561 disclose design examples for non-coaxial optical systems. In these documents, the concept of the "reference axis" is introduced, and they clarify that it is possible to construct an optical system with sufficiently corrected aberrations by making the constituent surfaces of the optical system aspherical surfaces which are asymmetrically shaped with respect to the reference axis.

Such a non-coaxial optical system is also referred to as an off-axial optical system, and, when the path which a light ray passing through the image center and the pupil center is taken as the reference axis, it is defined as an optical system including curved surfaces whose surface normals on the intersection between the surface and the reference axis do not coincide with the reference axis (off-axial curved surfaces). In this case, the reference axis has a bent shape.

The constituent surfaces of such an off-axial optical system are ordinarily non-coaxial, and it is easy to construct the optical system using reflective surfaces, since no vignetting occurs at the reflective surfaces. Moreover, by forming an intermediate image within the optical system, it is possible to configure a compact optical system while ensuring a large field angle.

Furthermore, it is possible to configure a compact optical system in which the optical path can be laid out comparatively freely while arranging the aperture stop in front of the optical system.

In the optical systems proposed in Japanese Patent Application Laid Open No. 2001-255462 (corresponding to U.S. Pat. No. 6,626,541) and Japanese Patent Application Laid Open No. 2000-89227, the strong points of such off-axial optical systems are utilized to correct the trapezoidal distortion at a fixed projection angle by using curved and rotationally asymmetric reflective surfaces.

On the other hand, small size and low profile are also desired for image-taking optical systems used for image-taking apparatuses such as cameras. In Japanese Patent Application Laid Open No. H08 (1996)-292372 described above, a small low-profile zoom image-taking optical system is proposed, which uses curved and rotationally asymmetric reflective surfaces.

However, off-axial optical systems using such reflective surfaces are often very sensitive to manufacturing discrepancies in surface precision or decentering or the like. For example, when there are asymmetric discrepancies in the surface shapes, the focus position deviates across the entire image surface for two directions orthogonal to each other in the image surface, that is, an astigmatic difference occurs. It is difficult to overcome this through mechanical adjustments during manufacturing in practice.

SUMMARY OF THE INVENTION

It is an object of the present invention to provide an image-formation optical system serving as an off-axial optical system configured using reflective surfaces, in which there is little performance deterioration with respect to manufacturing discrepancies, and which can be made sufficiently compact.

According to one aspect of the present invention, an image-formation optical system includes a reflective optical unit including a plurality of reflective surfaces. Each of the surfaces has a curvature and a rotationally asymmetric shape. Moreover, the following conditions are satisfied:

$$L/\{Er(S-1)\} < 2.2$$

$$3 < L/\{Eo(S-1)\}.$$

Herein, L represents an equivalent optical path length in air on a reference axis between a first reflective surface of the reflective optical unit which is closest to an object and a final reflective surface of the reflective optical unit which is closest to an image surface. The reference axis represents a path traveled by a principal ray passing through a center of a pupil and reaching a center of an image surface. Er represents a first diameter of an entrance pupil diameter of the reflective optical unit in a first direction perpendicular to a first sectional plane, which is a plane including the reference axis, Eo represents a second diameter of the entrance pupil in a second direction parallel to the first sectional plane. The second diameter Eo is smaller than the first pupil diameter Er. S represents the number of surfaces from the first reflective surface to the final reflective surface.

These and further objects and features of the image-formation optical system and optical apparatus according to the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

First, before going into the description of the embodiments, the notation for structural aspects in the embodiments as well as some common points of the embodiments are explained.

Figure 24:
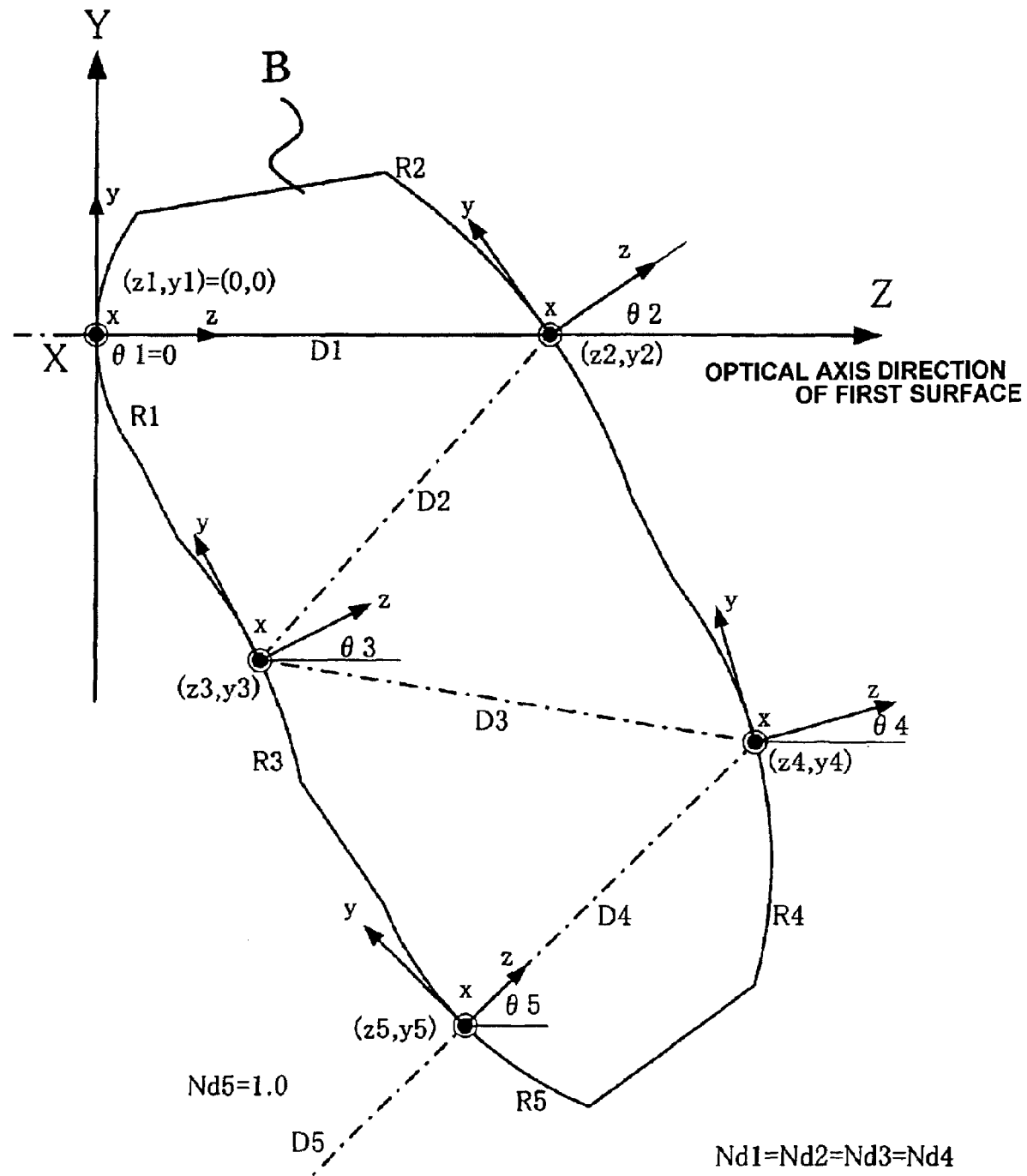
FIG. 24 illustrates the coordinate systems in the present embodiments.

FIG. 24 is a diagram of a coordinate system in which the structural data of the optical systems of the embodiments are defined. In the present embodiments, a light ray traveling from a demagnifying side (for example, the side of an original image formed by a liquid crystal panel or the like in an image projection apparatus) toward a magnifying side (for example, an image surface side where the screen is arranged in the image projection apparatus), or from the magnifying side (for example, an object side in an image-taking apparatus) toward the demagnifying side (for example, an image surface side where an image-pickup element such as a CCD sensor or the like is arranged in the image-taking apparatus), and from the center of an object surface (not shown in the drawings) through the center of a pupil (aperture stop) to the center of an image surface is referred to as a "central principal ray" or "reference axis ray" (indicated by a dash-dotted line in FIG. 24). And the path traveled by this ray is called the "reference axis." Moreover, an "i-th surface" means the i-the surface from the object side on the reference axis.

In FIG. 24, a first surface R1 is a refractive surface, a second surface R2 is a reflective surface which is tilted with respect to the first surface R1, a third surface R3 and a fourth surface R4 are reflective surfaces which are both shifted and tilted with respect to the surface respectively preceding them, and a fifth surface R5 is a refractive surface which is shifted and tilted with respect to the fourth surface R4. The various surfaces from the first surface R1 to the fifth surface R5 are constituted by a single optical element, which is made of a medium such as glass or plastic, namely a first optical element B shown in FIG. 24.

Consequently, in the structure in FIG. 24, the medium from the object surface (not shown in the drawings) to the first surface R1 is air, there is a common medium from the first surface R1 to the fifth surface R5, and the medium from the fifth surface R5 to a sixth surface R6 (not shown in the drawings) is air.

The optical system of each embodiment is an off-axial optical system, which means that the various surfaces constituting the optical system do not have a common optical axis. Therefore, in the following embodiments, an absolute coordinate system is set, whose origin is defined as the center of the first surface.

That is to say, the path of the light ray traveling through the origin of the absolute coordinate system, which is the center of the first surface, and through the center of the final image-formation surface, (that is, the central principal ray or reference axis ray) is defined as the reference axis. Furthermore, this reference axis is directional. The direction of the reference axis is the direction in which the central principal ray or reference axis ray travels during image formation. Moreover, in the following embodiments, the central principal ray or reference axis ray passes through the center (origin) of the first surface, and is refracted and reflected by the refractive surfaces and reflective surfaces before reaching the center of the final image-formation surface. The order of the structural surfaces is set in the order in which the central principal ray or the reference axis ray is refracted and reflected. Therefore, the reference axis changes its direction in accordance with the rules for refraction or reflection along the various surfaces in the set order, and finally reaches the center of the image surface.

Moreover, in the following embodiments, demagnifying side, panel surface side, object surface side, as well as magnifying side, predetermined image surface side and screen side indicate the sides with respect to the direction of the reference axis.

It should be noted that in the following embodiments, the reference axis serving as the reference for the optical system is set as described above, but when choosing the axis serving as the reference of the optical system, one should choose an axis which is appropriate with regard to the optical design, to account for aberrations and express the surface shapes constituting the optical system. Typically, however, the path of a light ray passing through the center of the image surface and the center of the aperture stop or the entrance pupil or the exit pupil or the first surface of the optical system, or the center of the final surface is set as the reference axis.

The various axes of the absolute coordinate system of the optical systems according to the following embodiments are defined as follows.

Z axis: A straight line passing through the origin and the center of the object surface. The direction from the object surface to the first surface R1 is defined as positive.

Y axis: A straight line passing through the origin and forming an angle of 90° counterclockwise with the Z axis, in accordance with the definition of a right-handed coordinate system.

X axis: A straight line passing through the origin and perpendicular to the Z axis and the Y axis.

Moreover, to express the surface shape and the tilt angle of the i-th surface of the optical system, a local coordinate system is defined by taking the point at which the reference axis intersects with the i-th surface as the origin. Expressing the surface shape of the surface in the local coordinate system and expressing the tilt angle as the angle defined by the reference axis and the local coordinate system makes shape and angle more intuitive than describing the shape and tilt angle of that surface in the absolute coordinate system. For this purpose, the surface shape of the i-th surface is expressed by the following local coordinate system. For this, first, a reference axial coordinate system is defined with respect to any given point on the reference axis as follows:

zb axis: A straight line passing through a given point on the reference axis. The direction of the reference axis is taken as positive. At points where the reference axis is deflected, the incidence direction is taken as positive.

yb axis: A straight line passing through a given point on the reference axis and forming an angle of 90° counterclockwise with the zb axis, in accordance with the definition of the right-handed coordinate system. At the origin of the absolute coordinate system, the yb axis coincides with the Y axis of the absolute coordinate system, and thereafter, there shall be no rotation with respect to the zb axis.

xb axis: A straight line passing through a given point on the reference axis and perpendicular to the zb axis and the yb axis.

Next, the local coordinate system is defined.

z axis: A surface normal through the origin of the local coordinate system.

y axis: A straight line through the origin of the local coordinate system, and forming an angle of 90° counterclockwise with the z axis, in accordance with the definition of the right-handed coordinate system.

x axis: A straight line through the origin of the local coordinate system and perpendicular to the ybzb plane.

Figure 25:
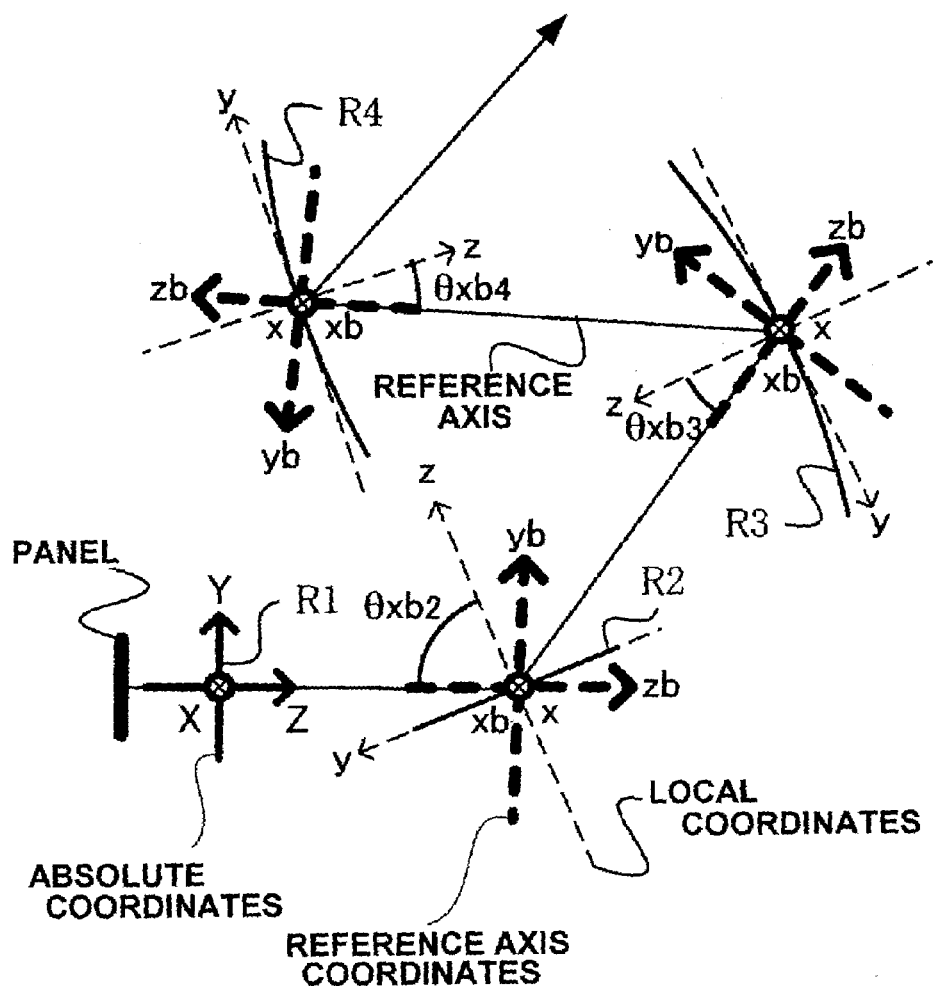
FIG. 25 illustrates the relationship between the absolute coordinate system, the coordinate systems on the reference axis and the local coordinate systems in the present embodiments.

Consequently, the tilt angle in the i-th ybzb plane is an acute angle formed by the z axis of the local coordinate system and the zb axis of the reference axial coordinate system, and is expressed as the angle $\theta xb,i$ (in degrees), taking the counterclockwise direction as positive. Moreover, the tilt angle in the i-th xbzb plane is expressed as the angle $\theta yb,i$ (in degrees) to the zb axis of the reference axial coordinate system, taking the counterclockwise direction as positive. And the tilt angle in the i-th xbyb plane is expressed as the angle $\theta zb,i$ (in degrees) to the yb axis of the reference axial coordinate system, taking the counterclockwise direction as positive. Ordinarily, however, $\theta zb,i$ corresponds to a rotation of the surface and does not exist in the following embodiments. FIG. 25 illustrates the relationship between the absolute coordinate system, the reference axial coordinate systems and the local coordinate systems.

Moreover, in the following embodiments, the numerical data for the structural surfaces are given as numerical examples. Herein, Di represents a scalar quantity expressing the distance between the origins of the local coordinate systems of the i-th surface and the (i+1)th surface, and Ndi and vdi represent, respectively, the refractive index and the Abbe number of the medium between the i-th surface and the (i+1)th surface. Furthermore, E-X is shorthand for $\times 10^{-X}$.

Here, the shape of spherical surfaces is expressed by the following equation:

$$z = \frac{(x^2 + y^2)/Ri}{1 + \{1 - (x^2 + y^2)/Ri^2\}^{1/2}} \quad (1)$$

Moreover, the optical systems of the present embodiments have at least one aspherical surface, which is rotationally asymmetric, and whose aspherical shape can be expressed by the following equation:

$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$

This curved surface equation includes only even terms for x, so that the curved surface given by this curved surface equation is plane symmetric with respect to the yz plane as the symmetry plane.

Moreover, if the following condition is satisfied, then the above equation expresses a shape which is symmetric with respect to the xz plane:

C03=C21=C05=C23=C41=t=0.

Moreover, if

C02=C20

C04=C40=C22/2 and

C06=C60=C24/3=C42/3 are satisfied, then the above equation expresses a rotationally symmetric shape. If these conditions are not satisfied, then it expresses a rotationally asymmetric shape.

It should be noted that in the following embodiments, duplicate explanations have been omitted, and that the meaning of like symbols is identical, unless indicated otherwise.

Embodiment 1

Figure 1:
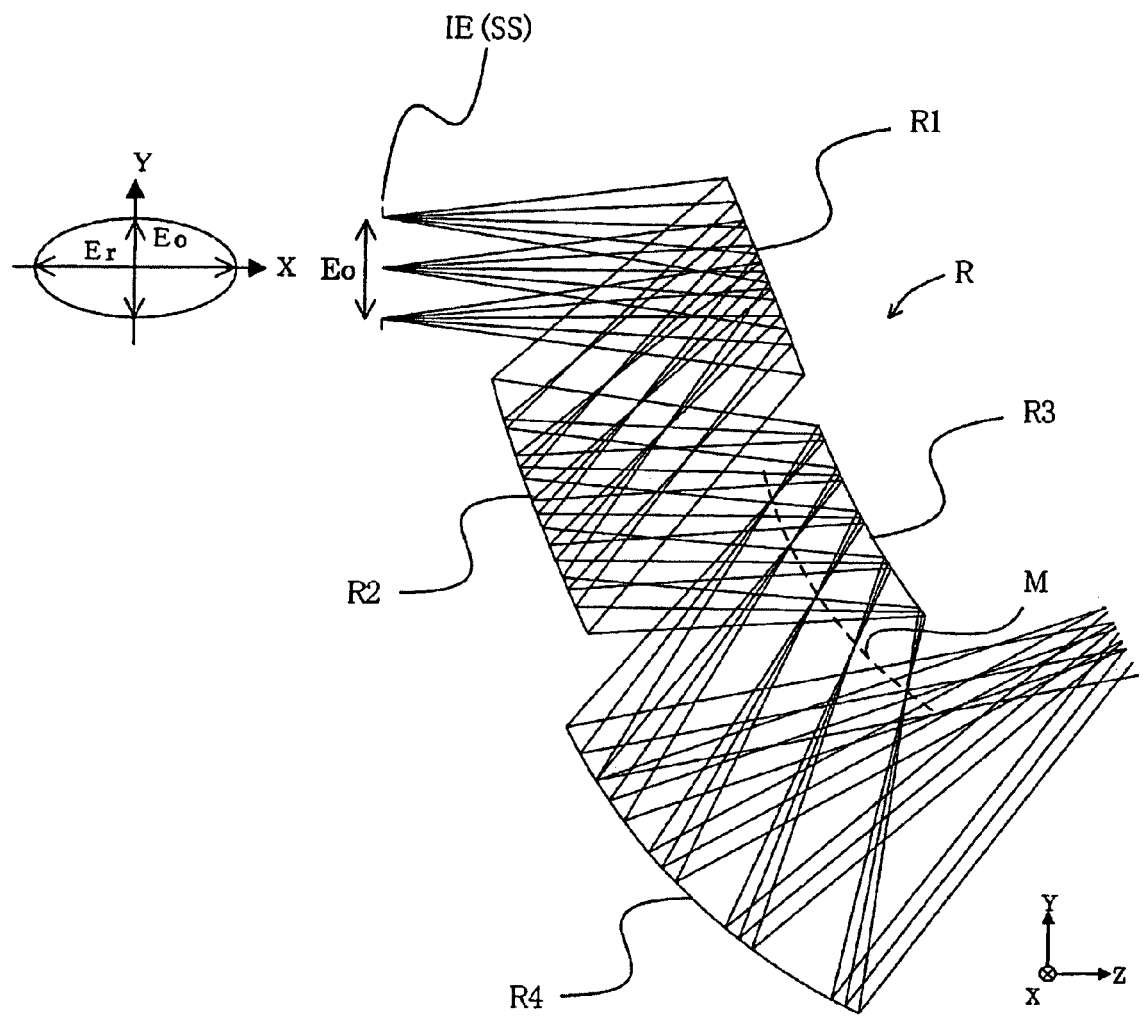
FIG. 1 is a cross-sectional view illustrating an image-formation optical system according to Embodiment 1 of the present invention.

FIG. 1 is a cross-sectional view illustrating an image-formation optical system according to Embodiment 1 of the present invention. The image-formation optical system in FIG. 1 is a projection optical system, and is used, for example, in an image projection apparatus, such as shown in FIG. 10.

Figure 10:
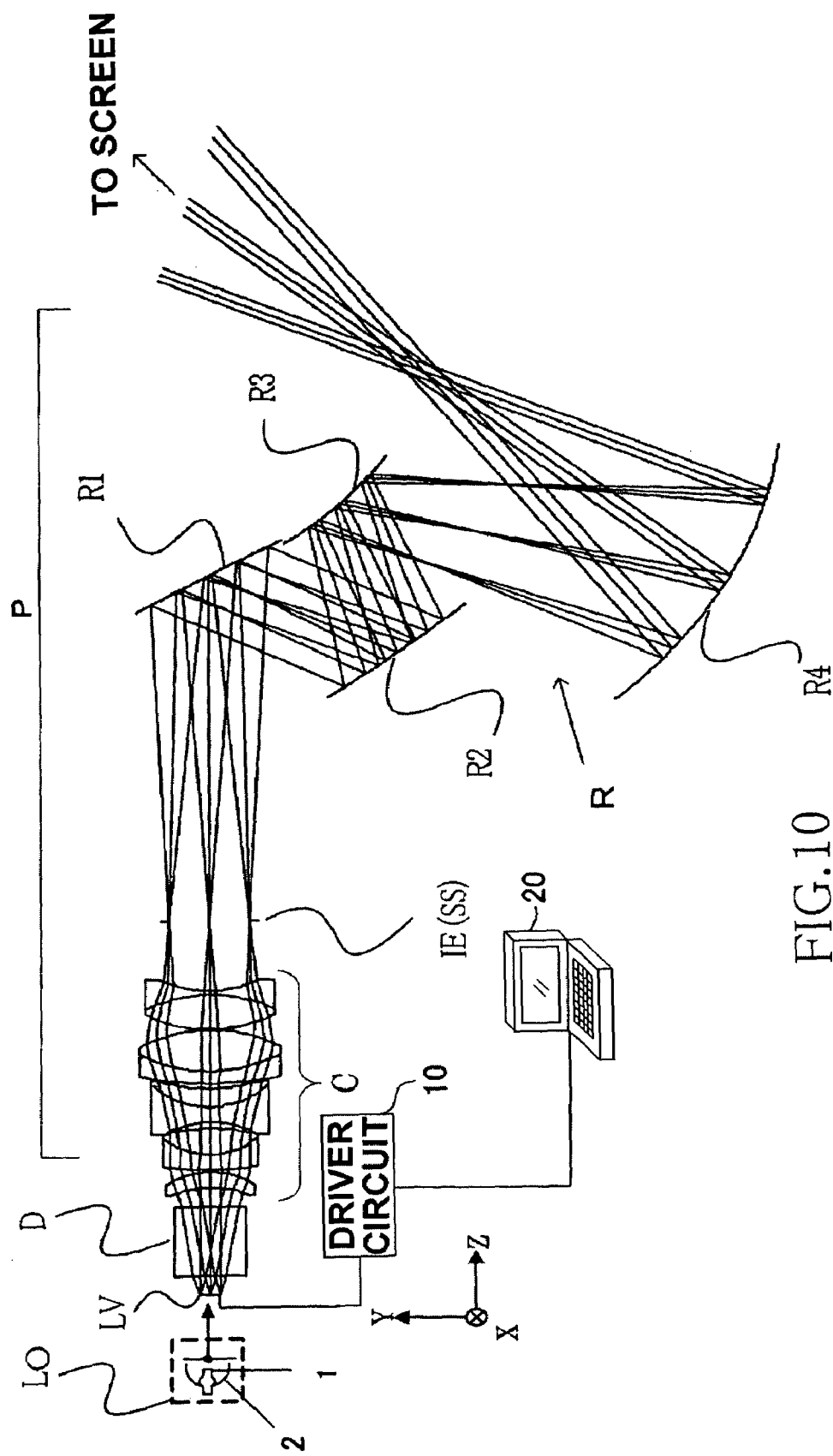
FIG. 10 is a cross-sectional view illustrating the structure of an image projection apparatus using the image-formation optical system according to Embodiment 1.

In FIG. 10, LO denotes an illumination system, which includes a lamp 1 that is a white light source, a reflection mirror 2, and a color separating element (not shown in FIG. 10) which separates the white light emitted from the lamp 1 into the three color light components of red, green and blue.

LV denotes a transmission-type liquid crystal display panel serving as an image-generating unit. This liquid crystal display panel LV is connected to a driver circuit 10, and the driver circuit 10 is connected to an image information supplying apparatus 20, such as a personal computer, a DVD player, a video recorder (VCR), a television, a digital video recorder, a digital still camera, or a receiver unit made of a tuner and an antenna receiving video images from electromagnetic waves. The driver circuit 10 receives the image information from the image information supplying apparatus 20, and sends driving signals corresponding to the image information to the liquid crystal display panel LV. The liquid crystal panel LV, which has received the driving signals, generates an original image corresponding to the driving signals with liquid crystals, and modulates light which is illuminated from the illumination system LO.

Even though it is not shown in the figure, in this embodiment, three liquid crystal display panels LV are provided for red, green and blue, respectively, and original images are generated for red, green and blue, respectively.

It should be noted that the present embodiment is explained for the case that transmission-type liquid crystal display panels are used for the image-generating units, but there is no limitation to this, and it is also possible to use a reflection-type liquid crystal display panel, a digital micromirror array (DMD), self-light emitting elements (electroluminescent elements) not necessitating an illumination system, or an image-generating unit in which laser light is scanned two-dimensionally while modulating it in accordance with the image information, for example.

D denotes a dichroic prism serving as a color combining element performing color combination of the color light components which have been modulated by the three liquid crystal display panels LV. The dichroic prism D is provided with a plurality of dichroic films, and combines the light components of the three colors due to the wavelength-dependent transmissive and reflective action of the dichroic films.

C denotes a refractive optical unit serving as a coaxial optical system constituted by a plurality of lenses. IE denotes, on the one hand, an exit pupil of the refractive optical unit C, and on the other hand an entrance pupil of an off-axial reflective optical unit R constituted by a plurality of reflective surfaces R1 to R4. An aperture stop SS is arranged at this position.

The light which has been color-combined by the dichroic prism D is magnified and projected onto a screen (not shown in the drawings) serving as a projection screen, after passing through the refractive optical unit C and the reflective optical unit R (R1 to R4).

Moreover, the projection optical system P constituted by the refractive optical unit C and the reflective optical unit R favorably corrects a trapezoidal distortion with the reflective optical unit R which is an off-axial optical system, and projects the images obliquely onto the screen.

It should be noted that the image-formation optical system according to the present embodiment is not limited to the image projection apparatus shown in FIG. 10, and may also be used for an image projection apparatus as shown in Embodiment 3, described below. Moreover, by including the refractive optical unit C in the projection optical system P, the optical power necessary for magnification and projection onto the screen can be divided as appropriate between the refractive optical unit C and the reflective optical unit R, the curvature of the reflective surfaces R1 to R4 of the reflective optical unit R can be softened, and a simpler structure becomes possible.

In FIG. 1, all of the reflective surfaces R1 to R4 constituting the reflective optical unit R have a rotationally asymmetric shape, constituting an off-axial optical system in which the reference axis is bent, as described above.

Furthermore, in the present embodiment, an intermediate image (intermediate image surface M) is formed once between the reflective surfaces R3 and R4 within the reflective optical unit R. Thus, the size of the reflective surfaces can be made smaller than in cases in which the reflective optical unit R forms no intermediate image, which is advantageous with regard to manufacturing the surface shapes with high precision. It should be noted that the position of the intermediate image surface M is not limited to the position shown in FIG. 1. Furthermore, also in the other embodiments described below, there is a similar intermediate image surface M within the reflective optical unit R.

Next, the shape of the entrance pupil on the XY plane in FIG. 1 is described. Here, the plane in which the reference axis is repeatedly reflected, that is, the plane including the bent reference axis is defined as the off-axial sectional plane (YZ plane, a first sectional plane). In this case, when Eo represents the diameter (width) of the entrance pupil IE within the off-axial sectional plane (in the direction parallel to the off-axial sectional plane) of the axial light flux on the reference axis (also referred to as a "reference axial light flux"), and Er represents the diameter (width) of the entrance pupil IE in the direction perpendicular to the off-axial sectional plane (in the following, the diameter of the entrance pupil is referred to as the "entrance pupil diameter"), then the following relationship is given:

$$Er=2Eo.$$

In other words, when $\theta o$ represents the divergent angle within the off-axial sectional plane of the reference axial light flux incident on the reflective optical unit R and $\theta r$ represents the divergent angle in the direction perpendicular to the off-axial sectional plane, then the following relation is satisfied:

$$\theta r=2\theta o.$$

Furthermore, when Fo represents the F number within the off-axial sectional plane of the reflective optical unit R, and Fr represents the F number in the direction perpendicular to the off-axial sectional plane, then the following relation is given:

$$Fo=2Fr$$

Off-axial optical systems using such reflective surfaces are often very sensitive to manufacturing discrepancies regarding surface precision and decentering and the like, which may cause problems during mass production. For example, when there are asymmetric discrepancies in the surface shapes, then a displacement of the focus position in the two vertically intersecting directions on the image surface occurs across the entire image surface, that is, there is an astigmatic difference, and it is difficult to overcome this by mechanical adjustments.

However, with the projection optical system of the present embodiment, it is possible to avoid this problem for the following reasons:

A first reason is explained with reference to FIGS. 27(A) to 27(D). The horizontal axis in FIGS. 27(A) to 27(D) marks positions near the image surface along the reference axis (focus position), and the vertical axis marks the contrast of the image (projection image) at these positions. In these figures, a higher contrast value is preferable. Moreover, the contrast curve for the off-axial sectional direction is indicated by a broken line, and the contrast curve for the direction perpendicular thereto is indicated by a solid line. Consequently, the position where the value of the contrast curve is highest (the peak of the curve), represents the optimum focus position for that direction.

Figure 27:
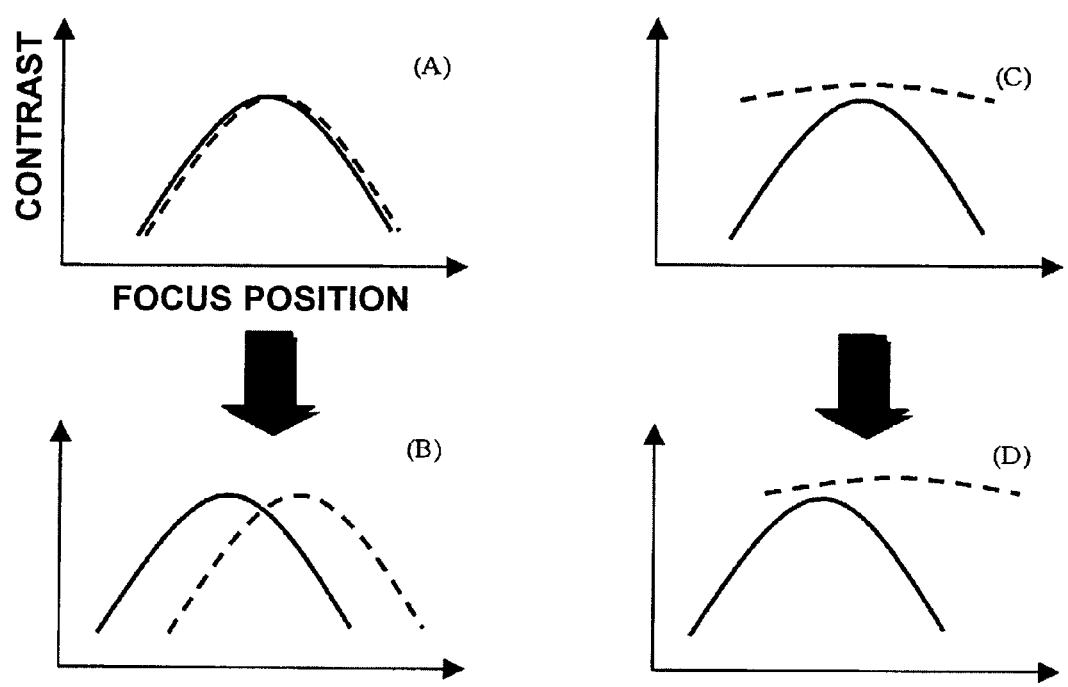
FIGS. 27(A) and 27(B) show the relation between the astigmatic difference and the depth of focus for manufacturing discrepancies in a conventional image-formation optical system.
FIGS. 27(C) and 27(D) show the relation between the astigmatic difference and the depth of focus for manufacturing discrepancies in an image-formation optical system according to the present invention.

FIG. 27(A) shows the case of an ordinary optical system in which the entrance pupil diameter Eo within the off-axial sectional plane of the reference axial light flux (that is, in the direction parallel to the sectional plane) and the entrance pupil diameter Er in the direction perpendicular thereto are the same (in the following, this is referred to as "(rotationally) symmetric entrance pupil diameters"). Since the entrance pupil diameters Eo and Er of the reflective optical unit are the same in both directions, there is no direction-dependent difference in the depth of focus, and the contrast curves of the two directions substantially overlap one another. In this case, when there is an asymmetric discrepancy in the surface shapes, then an astigmatic difference as in FIG. 27(B) occurs, the focus positions of the two directions move apart, leading to a deterioration of the image, since this occurs across the entire image surface.

However, if the entrance pupil diameters Eo and Er are different for the two directions, as in the present embodiment (in the following, this is referred to as "rotationally asymmetric entrance pupil diameters"), then there is a direction-dependent difference in the depth of focus. In FIG. 27(C), the depth of focus in the direction of the entrance pupil diameter Eo (in the direction parallel to the off-axial sectional plane), which is the smaller one and indicated by the broken line, is deeper than the focus depth in the direction of the entrance pupil diameter Er (in the direction perpendicular to the off-axial sectional plane), which is the larger one and indicated by the solid line, which shows that in this direction the deterioration of the contrast is small even when the position of the image fluctuates.

In this case, even when there is an asymmetric discrepancy in the surface shapes and a similar astigmatic difference occurs, the deterioration of the contrast in the direction parallel to the off-axial sectional plane with the smaller entrance pupil diameter Eo can be suppressed, as shown in FIG. 27(D).

Moreover, the behavior of the astigmatic difference is uniform across the entire image area, so that if the image surface is placed at the optimum focus position for the direction perpendicular to the off-axial sectional plane shown by the solid curve for the entire image area, then it is possible to preserve a high contrast for both directions, because there is little deterioration even when deviating from the optimum focus position in the direction parallel to the off-axial sectional plane shown by the broken curve.

Here, the fact that the entrance pupil diameters Eo and Er are asymmetric is equivalent to saying that the divergent angles of the incident light flux are asymmetric or that the F numbers are different.

Figure 7:
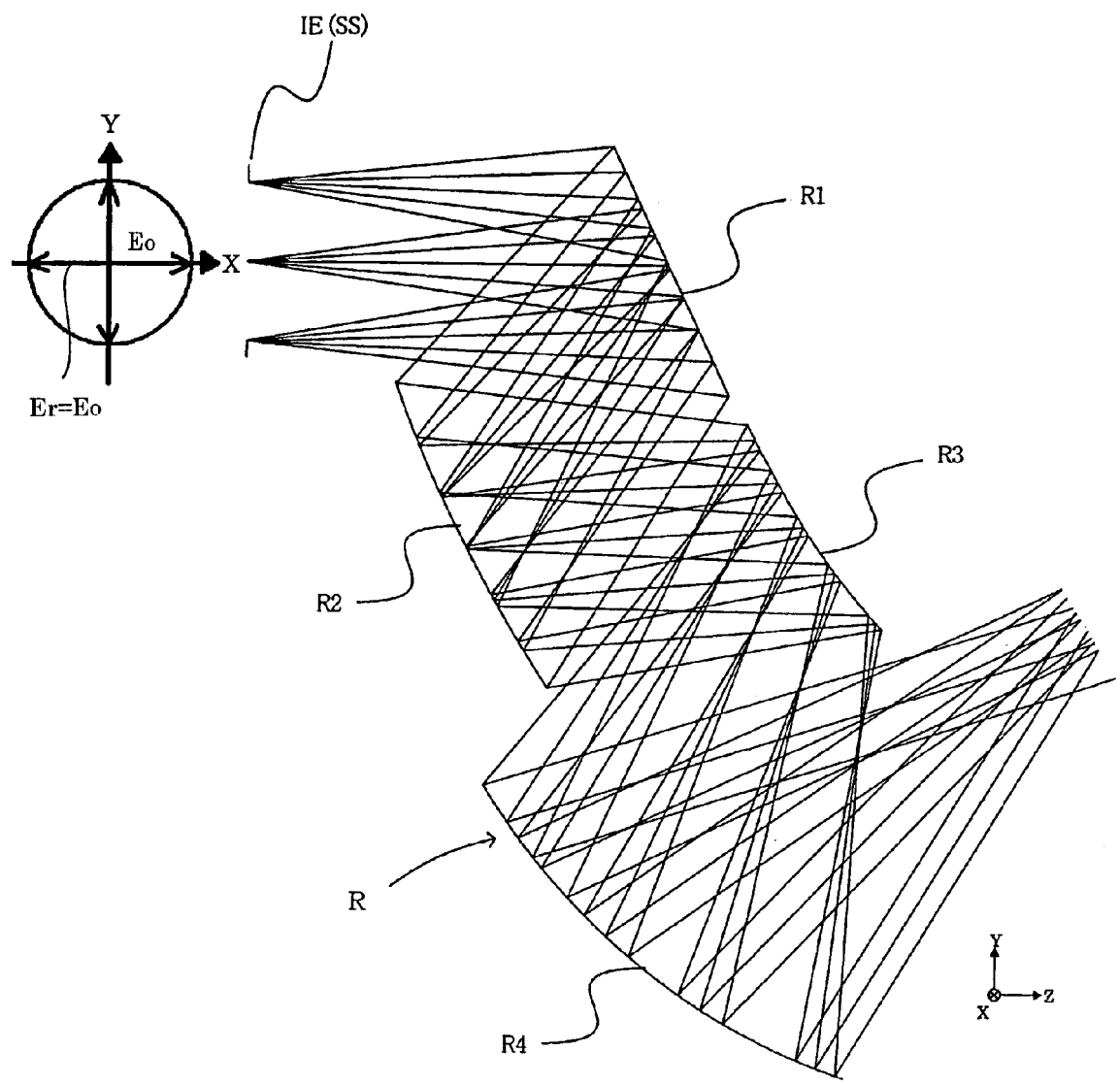
FIG. 7 is a cross-sectional view illustrating the structure of a conventional image-formation optical system.

The following is an explanation of a second reason, with reference to FIG. 1 and FIG. 7. The reflective optical unit R shown in FIG. 7 has an object surface and an image surface which have the same size as the reflective optical unit R in FIG. 1, and differs from the reflective optical unit R in FIG. 1 only in that its entrance pupil diameters in both X and Y direction are symmetric (that is, the diameters are the same).

The rotationally symmetric entrance pupil diameters Eo and Er in FIG. 7 are equal to Er in FIG. 1. Here, the angle defined by the reference axis incident on a given reflective surface and the reference axis emerging after reflection is defined as an "off-axial reference axis angle."

Ordinarily, when discussing aberrations of an off-axial optical system, it is known that the size of this off-axial reference axis angle may be a cause of asymmetric aberrations occurring due to the reflection at that reflective surface.

Furthermore, the influence of discrepancies in the reflective surfaces on the aberrations is larger for surfaces closer to the pupil. This is so because when a light flux at a given field angle is observed, the divergence of that light flux is larger for surfaces closer to the pupil.

Table 1 shows a comparison of the off-axial reference axis angles of the reflective surfaces R1 to R4 in the reflective optical units (or projection optical systems) of FIGS. 7 and 1. It should be noted that in the present embodiment, the object distance from the object surface to the aperture stop SS is 400 mm, and the object surface is defined as a spherical surface whose center of curvature exists on the center of the aperture (with a curvature radius of 400 mm). Moreover, the field angle is x: ±7.71° and y: ±7.71°. The focal length is x: 137.24 mm, y: 154.87 mm. The size of the image surface is 1828.8 mm×1828.8 mm.

From Table 1, it can be seen that by making the entrance pupil diameters asymmetric (Er=2Eo) as in FIG. 1, there is the tendency that the off-axial reference axis angle becomes smaller at each of the reflective surfaces, compared to the case that the entrance pupil diameters are symmetric (Er=Eo) as in FIG. 7. A portion of Table 1 is not in accordance with this, but this is caused by the fact that the object surface and the image surface are maintained parallel as shown in the image-taking system in FIG. 18, and due to the manufacturing conditions for integrally forming the plurality of reflective surfaces constituting the optical system, but this does not change the fact that the present invention has the effect of allowing to make the off-axial reference axis angles smaller.

This shows that since the entrance pupil diameter Eo in the direction parallel to the off-axial sectional plane is smaller than the entrance pupil diameter Er of the direction perpendicular thereto, the light flux of the overall field angle in the direction parallel to the off-axial sectional plane becomes narrower, and that it is possible to reduce the off-axial reference axis angles. If the off-axial reference axis angles are large, then also the performance deterioration due to manufacturing discrepancies becomes large.

This can also be understood from the fact that the deviation of the power of the reflective surfaces when manufacturing discrepancies increases depending on the size of the off-axial reference axis angle, as can be seen when the focal length of the off-axial reflective surface is differentiated with respect to the displacements (dx, dy, dθ) of the reference axis due to the manufacturing discrepancies, in accordance with the method for calculating the power of the off-axial optical system disclosed in Japanese Patent Application Laid Open No. H09 (1997)-5650.

Consequently, by making the off-axial reference axis angle as small as possible, as in the present embodiment, it is possible to improve also the image-forming performance of the projection optical system, since it is possible to suppress the occurrence of performance deterioration due to manufacturing discrepancies. For this reason, as shown in FIG. 27(C), the contrast for the direction parallel to the off-axial sectional plane (shown by the broken line) for which the entrance pupil diameter Eo is small, does not fluctuate greatly depending on the focus position, and also its maximum value is increased compared to the case that the entrance pupil diameters are symmetric, as shown in FIG. 27(A).

Next, a third reason is explained with reference to FIGS. 1 and 7. When discussing the image deterioration due to manufacturing discrepancies, also the optical path length of the optical system is an important factor, in addition to the off-axial reference axis angle. If there are manufacturing discrepancies at the reflective surface R1 shown in FIG. 1 and FIG. 7, then the positions of the rays incident on the reflective surface R2 deviate from their original positions.

Figure 2:
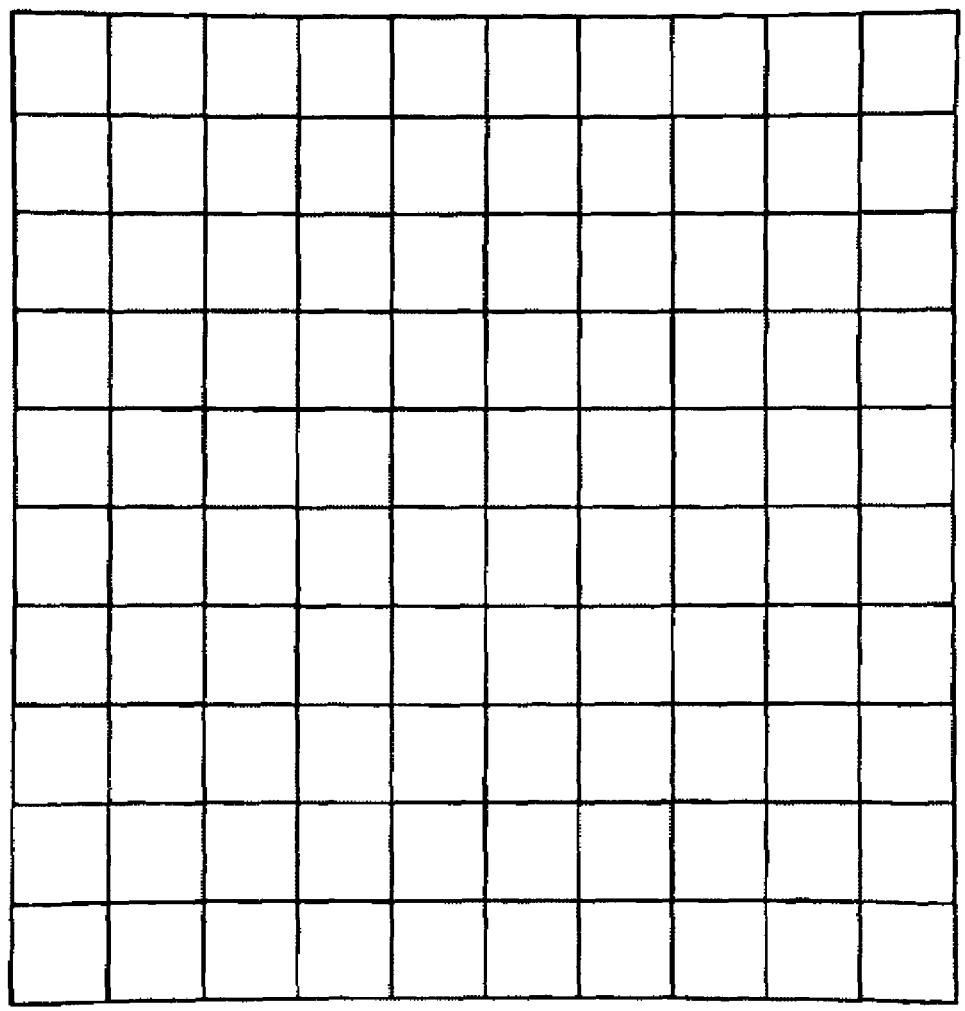
FIG. 2 illustrates the distortion in the image-formation optical system of Embodiment 1.

When the same amount of discrepancies occurs at the reflective surface R1 in FIGS. 1 and 2, then a larger deviation occurs at the incidence on the reflective surface R2 in FIG. 7, as the distance between the reflective surface R1 and R2 is longer. And the repeated reflections at the reflective surfaces R3 and R4 enlarge this discrepancy even further.

Consequently, making the optical path length short is advantageous with regard to suppressing an enlarging of discrepancies. Table 2 shows a comparison of the optical path lengths from the reflective surface R1 to the reflective surface R4 for the projection optical system of FIG. 7, in which the entrance pupil diameters are symmetric and the projection optical system of FIG. 1, in which the entrance pupil diameters are asymmetric (the entrance pupil diameter in the direction parallel to the off-axis sectional surface is smaller).

Table 2 shows a comparison of the values of $L/\{Er(S-1)\}$ and $L/\{Eo(S-1)\}$, where L represents an equivalent optical path length in air between the first reflective surface R1 of the reflective optical unit R, which is closest to the object, and the final reflective surface R4 of the reflective optical unit R, which is closest to the image surface, Er represents an entrance pupil diameter in the direction perpendicular to the off-axial sectional plane, Eo represents the entrance pupil diameter in the direction parallel to the off-axial sectional plane, and S represents the number of surfaces from the first reflective surface R1 to the final reflective surface R4. These values of $L/\{Er(S-1)\}$ and $L/\{Eo(S-1)\}$ represent the optical path length L normalized by the entrance pupil diameter, the medium and the number of reflective surfaces, which determine the scale of the reflective optical unit R.

From Table 2, it can be seen that the optical path length tends to become shorter when the entrance pupil diameters are made asymmetric. This is because the entrance pupil diameter Eo in the direction parallel to the off-axial sectional plane is smaller than the entrance pupil diameter Er in the direction perpendicular thereto, so that the light flux of the overall field angles in the direction parallel to the off-axial sectional plane become narrower, the divergent angle of the light ray for each field angle becomes smaller, and interference due to the spatial arrangement of light rays and reflective surfaces can be prevented even when the surface distance becomes narrower.

As described above, in the present embodiment, by making the entrance pupil diameters of the reflective optical unit asymmetric, in particular by making the entrance pupil diameter in the direction parallel to the off-axial sectional plane smaller than the entrance pupil diameter in the direction perpendicular thereto, a reflective optical unit (and thus projection optical system) and an image projection apparatus can be realized, which are very compact and which have little performance degradation with respect to manufacturing discrepancies while maintaining the brightness at the image surface.

It should be noted that with regard to the illumination intensity on the image surface, it is preferable that the divergent angle of the incident light flux from the illumination system is also made asymmetrical, when making the entrance pupil diameters asymmetrical.

The following shows the structural data of a reflective optical unit R for a numerical example according to Embodiment 1. As noted above, the object distance from the object surface to the aperture stop SS is 400 mm, and the object surface is defined as a spherical surface whose center of curvature exists on the center of the aperture stop (with a curvature radius of 400 mm). Moreover, the field angle is x: ±7.71° and y: ±7.71°. The focal length is x: 137.24 mm, y: 154.87 mm. The size of the image surface is 1828.8 mm×1828.8 mm.

NUMERICAL EXAMPLE 1

Entrance pupil diameters of off-axial reflective optical unit: Eo: 13.50 mm; Er: 27.00 mm

| surf. | Yi | Zi | Di | θxb, i | |
|---|---|---|---|---|---|
| 1 (SS) | 0.00 | 0.00 | 53.00 | 0.00 | aperture stop |
| 2 (R1) | 0.00 | 53.00 | 45.00 | 23.00 | refl. surf. |
| 3 (R2) | −32.37 | 21.74 | 45.00 | −23.00 | refl. surf. |
| 4 (R3) | −32.37 | 66.74 | 53.79 | 30.00 | refl. surf. |
| 5 (R4) | −78.95 | 39.85 | 2370.00 | −16.00 | refl. surf. |
| 6 | 1033.70 | 2132.43 | 25.40 | | image surf. | aspherical surface shapes:
surface 2 (R1)
  C02: −6.6929E−04 C03: 1.9942E−05 C04: 3.5238E−07
  C05: −4.0546E−09 C06: −3.6492E−10 C20: −1.1272E−03
  C21: 2.2639E−05 C22: 3.6858E−07 C23: −1.4852E−09
  C24: −3.6534E−10 C40: 8.3629E−08 C41: 2.2826E−09
  C42: −2.6622E−11 C60: 9.3704E−12
surface 3 (R2)
  C02: 2.4430E−03 C03: 2.9178E−05 C04: −9.4344E−09
  C05: −7.4058E−09 C06: −9.0694E−11 C20: 2.1859E−03
  C21: 3.9969E−05 C22: −7.4362E−08 C23: −9.4285E−09
  C24: −1.3730E−10 C40: 4.1582E−08 C41: −6.6813E−10
  C42: 3.8725E−11 C60: 4.6869E−12
surface 4 (R3)
  C02: 5.0704E−03 C03: −2.3209E−05 C04: −2.5925E−06
  C05: −1.0200E−07 C06: 1.6250E−09 C20: 6.9337E−03
  C21: 4.6350E−06 C22: −4.7455E−06 C23: −1.7520E−07
  C24: −2.8072E−10 C40: −1.8527E−06 C41: −3.1413E−08
  C42: 3.9036E−09 C60: 6.0819E−10
surface 5 (R4)
  C02: 5.8700E−03 C03: −4.5193E−06 C04: 1.3054E−07
  C05: −5.4767E−11 C06: 1.2761E−11 C20: 6.3995E−03
  C21: −5.5409E−06 C22: 3.3394E−07 C23: −9.2880E−10
  C24: 3.4146E−11 C40: 1.7873E−07 C41: −6.4279E−10
  C42: 6.5206E−11 C60: 2.3977E−11

Figure 3:
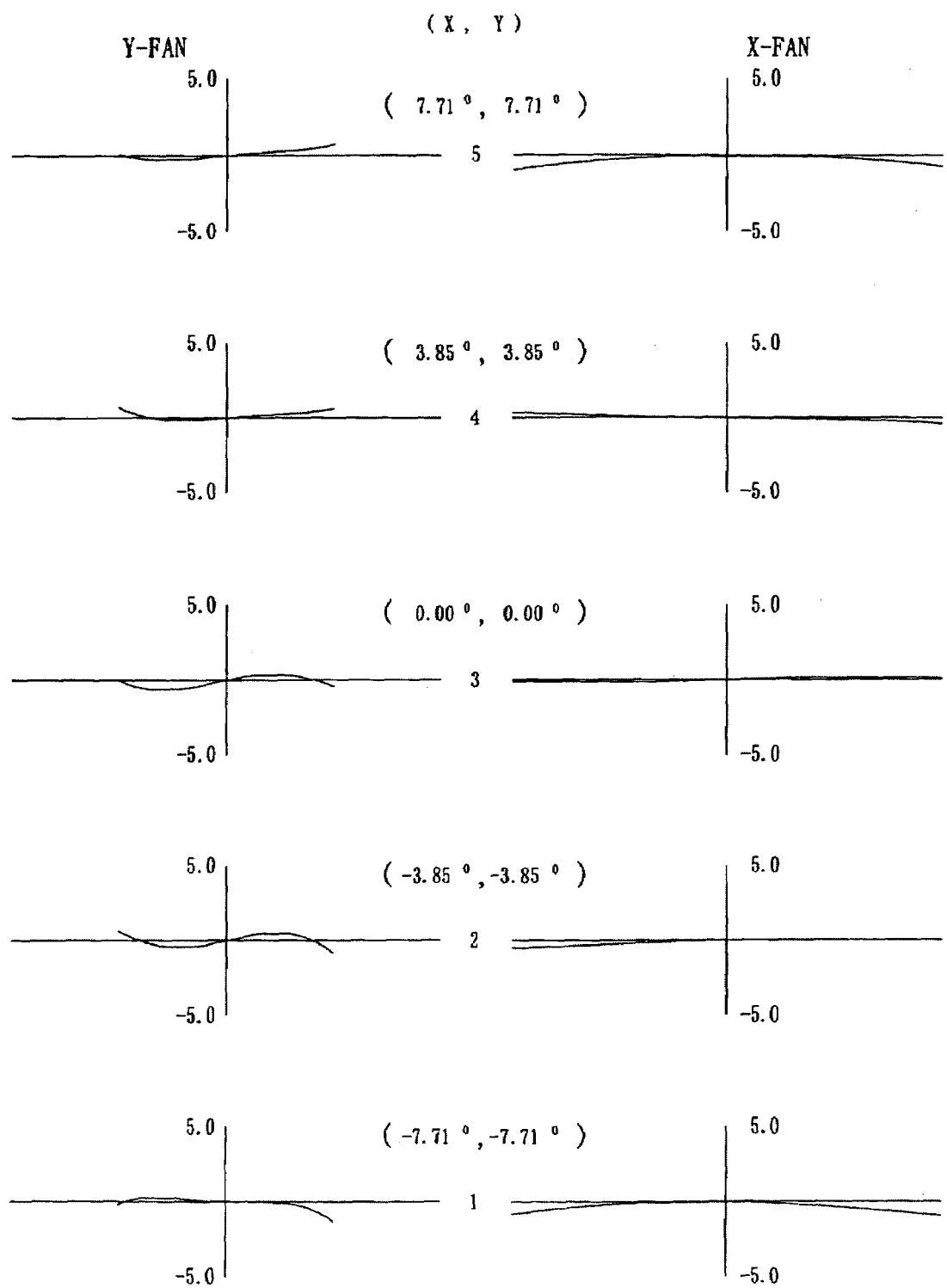
FIG. 3 shows transverse aberration charts for the image-formation optical system of Embodiment 1.
Figure 26:
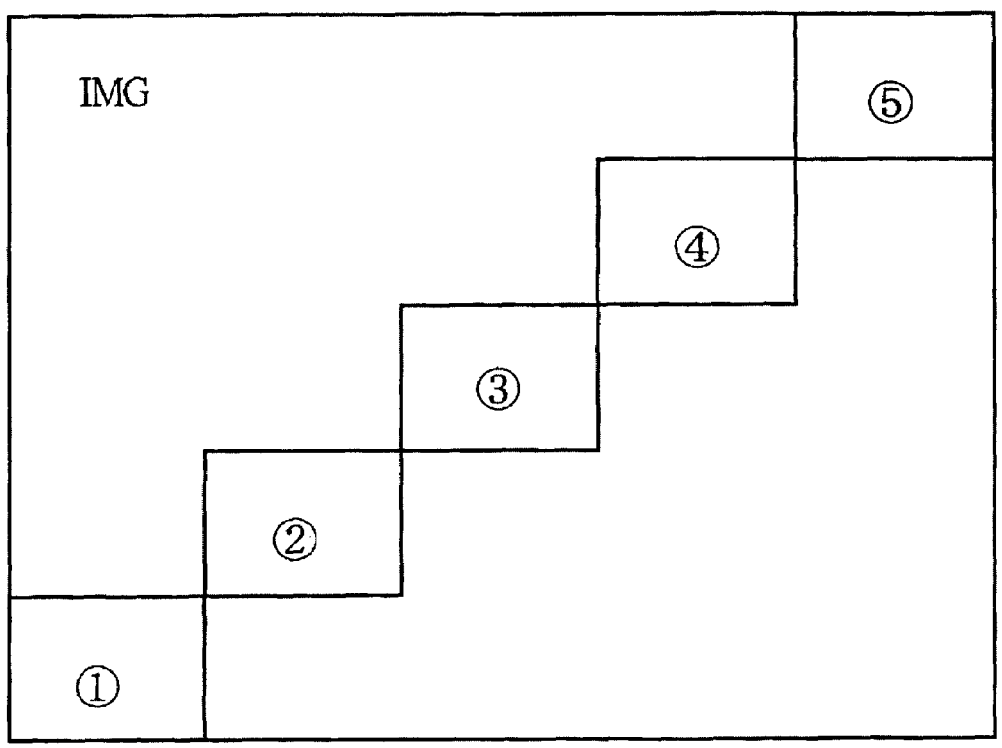
FIG. 26 illustrates the evaluation positions for the transverse aberrations in the present embodiment.

FIG. 2 illustrates the distortion of Numerical Example 1, and FIG. 3 shows transverse aberration charts at the evaluation positions 1 to 5 marked by the circled numbers on the image surface IMG in FIG. 26. It can be seen from FIG. 2, that there are no large distortions and also that the asymmetric distortion is small.

In the transverse aberration charts in FIG. 3, the horizontal axis marks the X axis or the Y axis on the pupil plane, and the vertical axis marks the aberration amount on the image surface. The wavelength of the evaluation light rays is 546.07 nm. From these figures, it can be seen that excellent image formation is attained for each of the axial directions.

Figure 8:
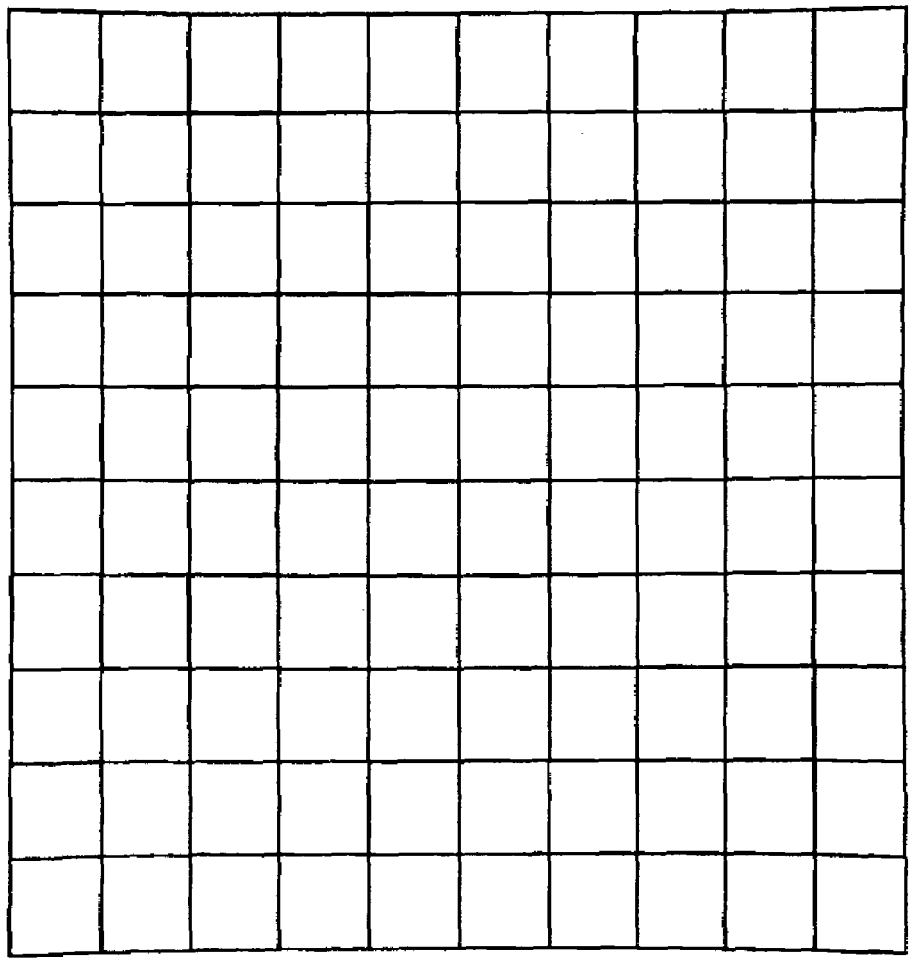
FIG. 8 illustrates the distortion in the conventional image-formation optical system.
Figure 9:
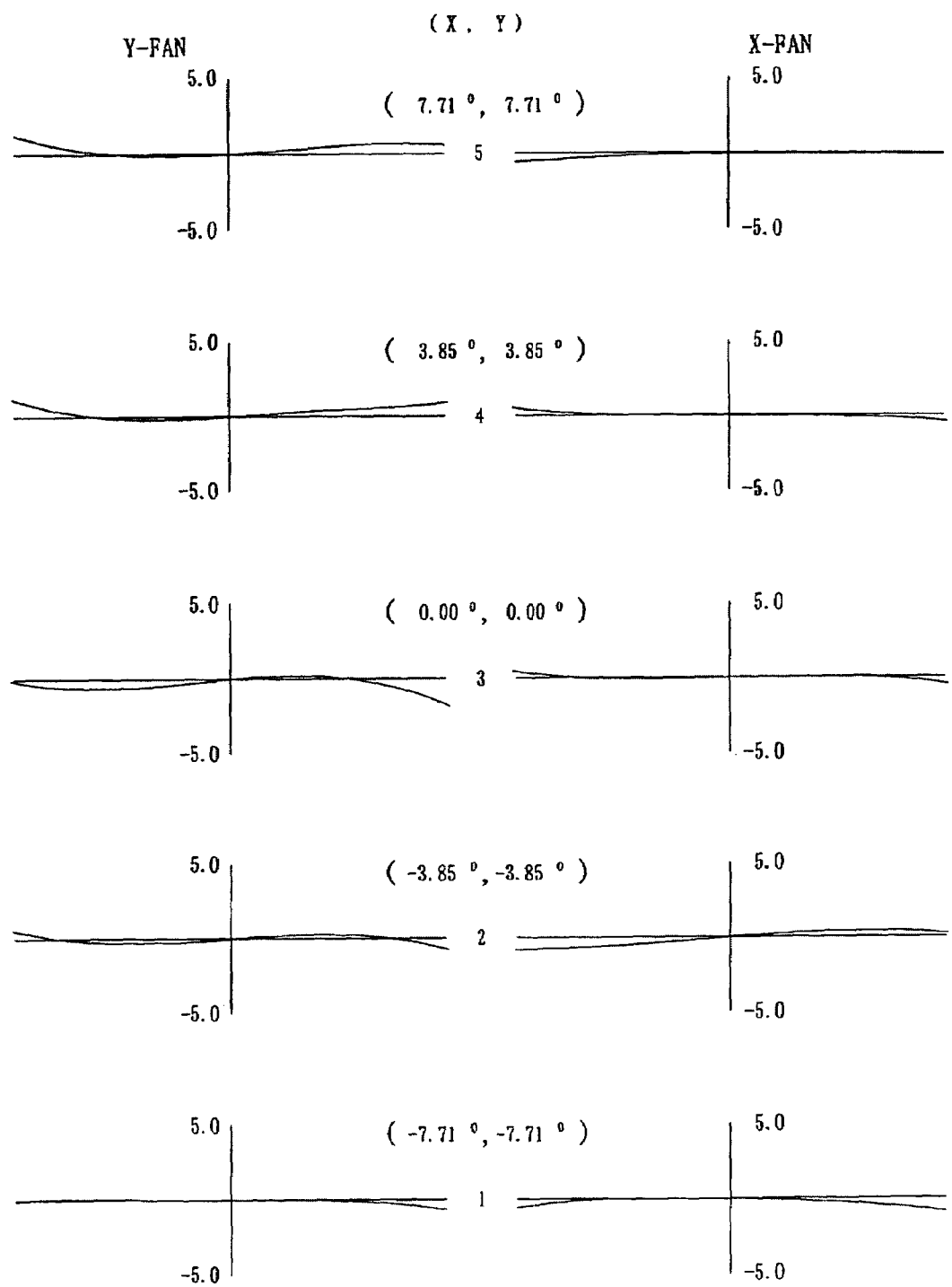
FIG. 9 shows transverse aberration charts for the conventional image-formation optical system.

For comparison, FIG. 8 illustrates the distortion for the optical system shown in FIG. 7, in which the entrance pupil diameters are symmetric, and FIG. 9 shows the transverse aberration charts at the same evaluation positions on the image surface. With symmetric entrance pupil diameters, it is easier to attain a good performance, but the reflective surfaces and overall optical system for attaining a good performance become large, which leads to manufacturing difficulties.

Embodiment 2

Figure 4:
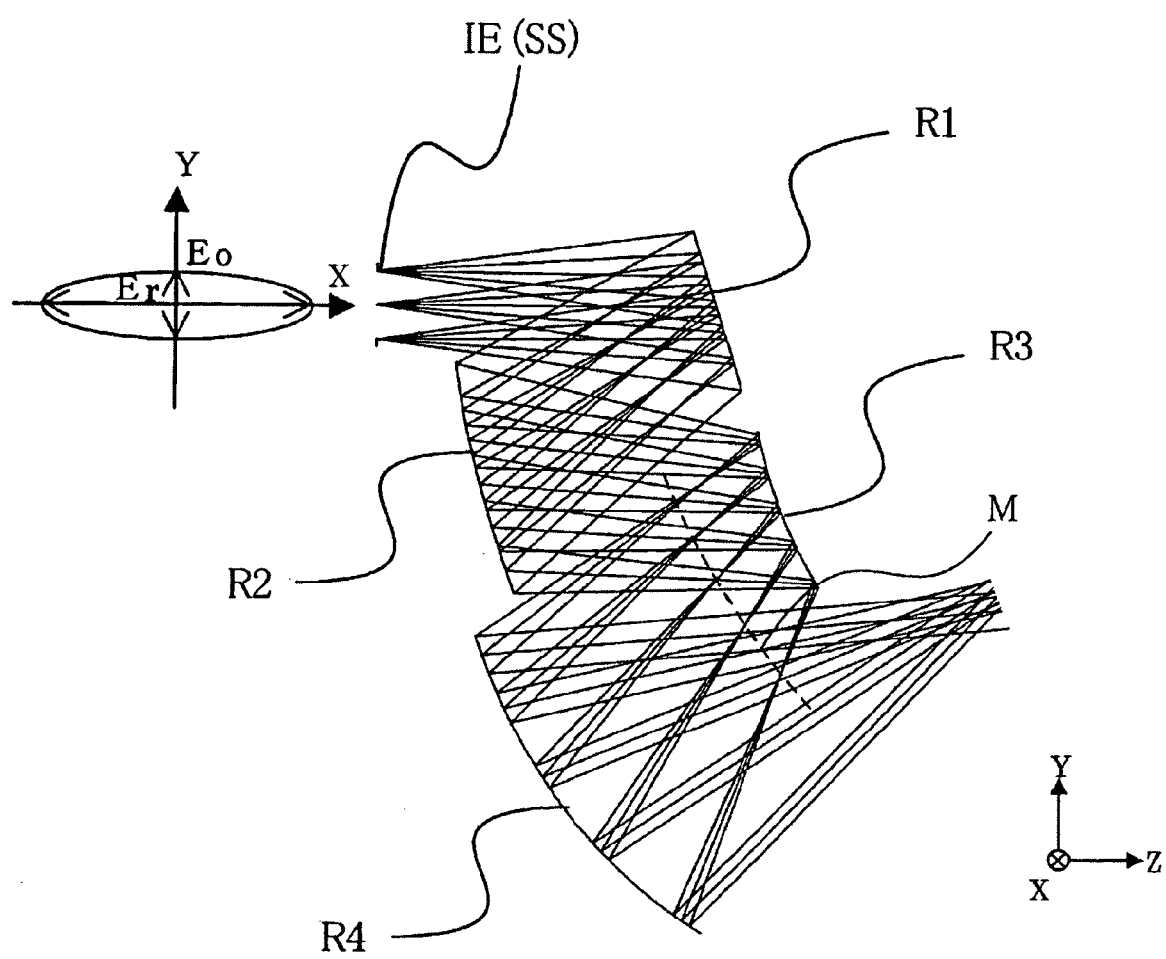
FIG. 4 is a cross-sectional view illustrating the structure of an image-formation optical system according to Embodiment 2 of the present invention.

FIG. 4 is a cross-sectional view illustrating the structure of the reflective optical unit of a projection optical system (image-formation optical system) according to Embodiment 2 of the present invention. The projection optical system of this embodiment is used for an image projection apparatus, like the projection optical system of FIG. 1, which is explained in Embodiment 1. Moreover, the reflective optical unit of the present embodiment is made of four reflective surfaces R1 to R4, like the reflective optical unit of Embodiment 1. However, the entrance pupil diameters of the reflective optical unit of the present embodiment satisfy the following equation:

$$Er = 4Eo$$

Table 1 shows the size of the off-axial reference axis angles of the reflective optical unit in FIG. 4, and Table 2 shows the optical path length L (equivalent value in air) from the first reflective surface R1 to the final reflective surface R4 normalized by the entrance pupil diameter Er and the number S of reflective surfaces.

By making the ratio of the asymmetric entrance pupil diameters large, it is possible to make the off-axial reference axis angle smaller and the optical path length shorter than in Embodiment 1. Thus, it is possible to realize a projection optical system in which the performance deterioration due to manufacturing discrepancies is small and which is very compact, as well as an image projection apparatus using the same.

It should be noted that in this embodiment the object distance from the object surface to the aperture stop SS is 400 mm, and the object surface is defined as a spherical surface whose center of curvature exists on the center of the aperture stop (with a curvature radius of 400 mm). Moreover, the field angle is x: ±7.71° and y: ±7.71°. The focal length is x: 138.57 mm, y: 154.44 mm. The size of the image surface is 1828.8 mm×1828.8 mm.

The following shows the structural data of a reflective optical unit, for a numerical example according to the present embodiment.

NUMERICAL EXAMPLE 2

Entrance pupil diameters of off-axial reflective optical unit: Eo: 6.75 mm; Er: 27.00 mm

| surf. | Yi | Zi | Di | θxb, i | |
|---|---|---|---|---|---|
| 1 (SS) | 0.00 | 0.00 | 35.00 | 0.00 | aperture stop |
| 2 (R1) | 0.00 | 35.00 | 30.00 | 18.00 | refl. surf. |

-continued

| surf. | Yi | Zi | Di | θxb, i | |
|---|---|---|---|---|---|
| 3 (R2) | −17.63 | 10.73 | 31.00 | −20.00 | refl. surf. |
| 4 (R3) | −19.80 | 41.64 | 36.00 | 26.00 | refl. surf. |
| 5 (R4) | −46.55 | 17.57 | 2370.00 | −13.00 | refl. surf. |
| 6 | 841.27 | 2214.99 | 25.40 | | image surf. | aspherical surface shapes:

surface 2 (R1)
 C02: −5.9562E-04 C03: 4.8773E-05 C04: 1.1108E-06
 C05: 1.0199E-08 C06: 4.5433E-10 C20: −1.1477E-03
 C21: 3.5982E-05 C22: 7.7617E-07 C23: −1.4437E-08
 C24: −3.4479E-09 C40: 2.5128E-07 C41: −5.7608E-09
 C42: −1.6312E-10 C60: −1.0284E-11 surface 3 (R2)
 C02: 4.8676E-03 C03: 4.7206E-05 C04: −1.1202E-07
 C05: −1.0060E-08 C06: 8.1271E-10 C20: 4.4453E-03
 C21: 2.8698E-05 C22: −1.0401E-07 C23: −1.8520E-08
 C24: −1.5525E-09 C40: 1.4863E-07 C41: −1.7294E-08
 C42: 2.2097E-10 C60: 3.9219E-12 surface 4 (R3)
 C02: 1.1579E-02 C03: −8.9096E-05 C04: −1.9460E-05
 C05: −3.2906E-07 C06: 9.5006E-08 C20: 9.3197E-03
 C21: −4.1907E-04 C22: −2.1069E-05 C23: −6.2617E-07
 C24: 4.6947E-09 C40: −8.2606E-06 C41: −3.2294E-07
 C42: 1.1180E-07 C60: 7.5873E-09 surface 5 (R4)
 C02: 9.1320E-03 C03: −9.7700E-06 C04: 5.0507E-07
 C05: −1.4286E-09 C06: 2.5745E-10 C20: 1.0238E-02
 C21: −8.4766E-06 C22: 1.0544E-06 C23: −6.4809E-09
 C24: 3.1336E-10 C40: 6.4752E-07 C41: −9.1052E-10
 C42: 7.8302E-10 C60: 2.5812E-10

Figure 5:
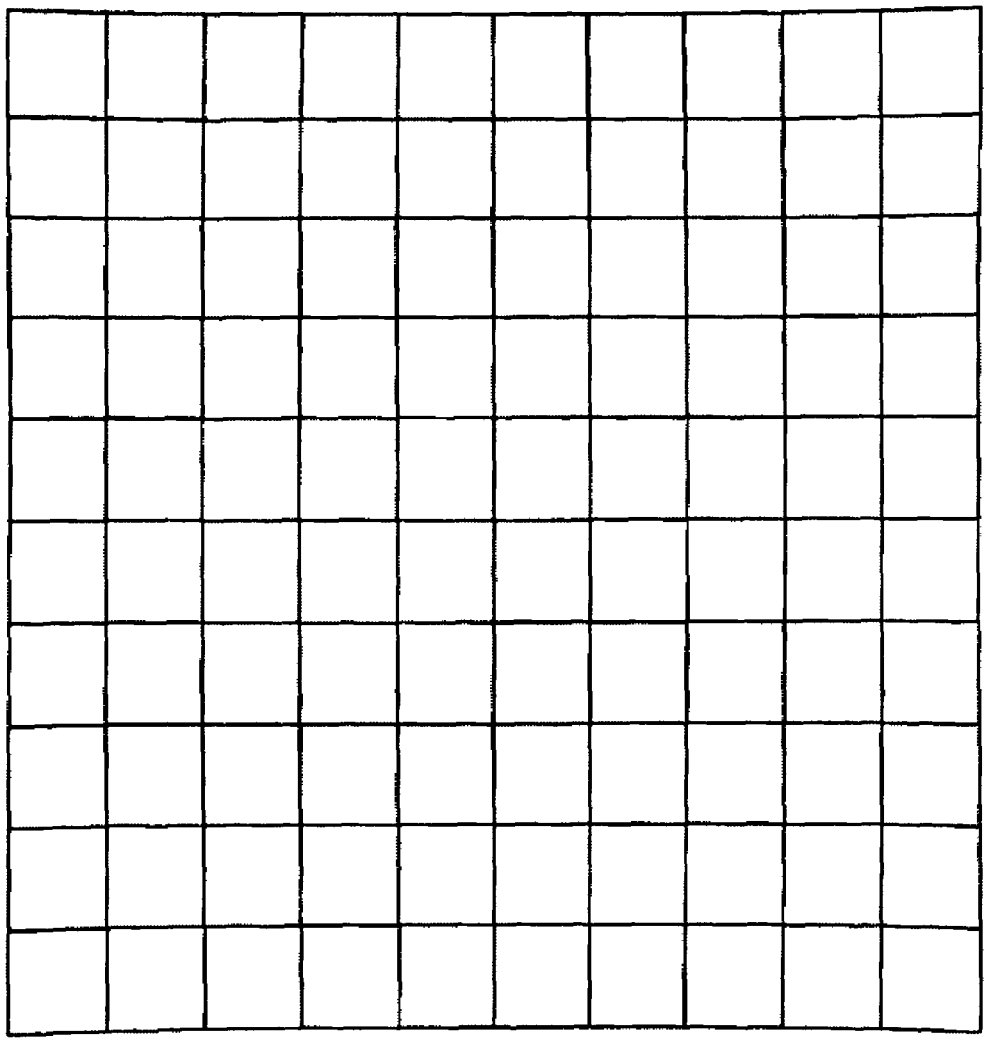
FIG. 5 illustrates the distortion in the image-formation optical system of Embodiment 2.
Figure 6:
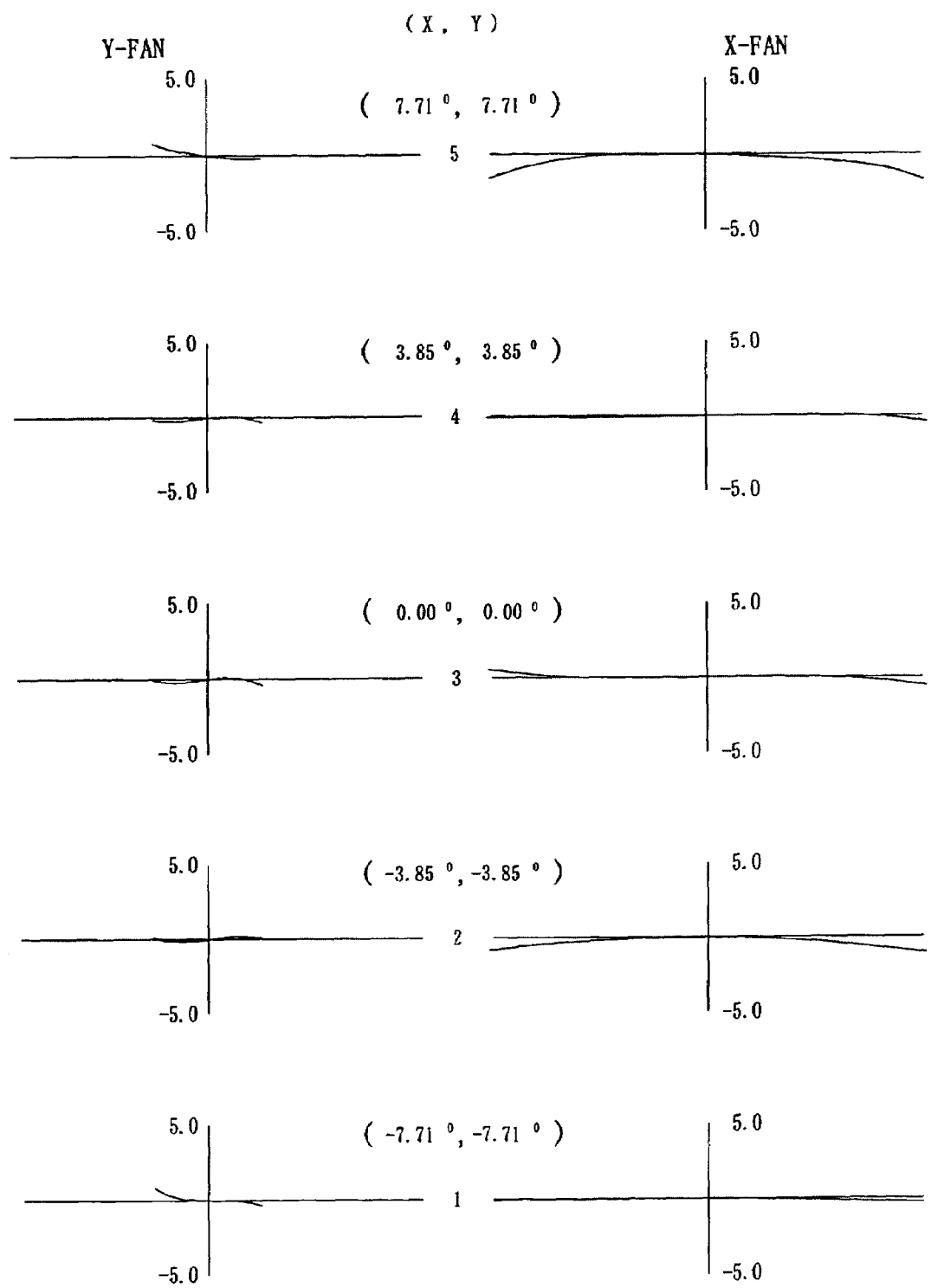
FIG. 6 shows transverse aberration charts for the image-formation optical system of Embodiment 2.

FIG. 5 illustrates the distortion of this numerical example, and FIG. 6 shows transverse aberration charts at the evaluation positions 1 to 5 marked by the circled numbers on the image surface IMG in FIG. 26. The definitions of the axes and the evaluation wavelength in FIG. 6 are the same as for FIG. 3. It can be seen from FIG. 5, that there is no large distortion and also that the asymmetric distortion is small. Also, it can be seen from FIG. 6, that favorable image formation is performed with regard to both the X-axis direction and the Y-axis direction.

Embodiment 3

Figure 11:
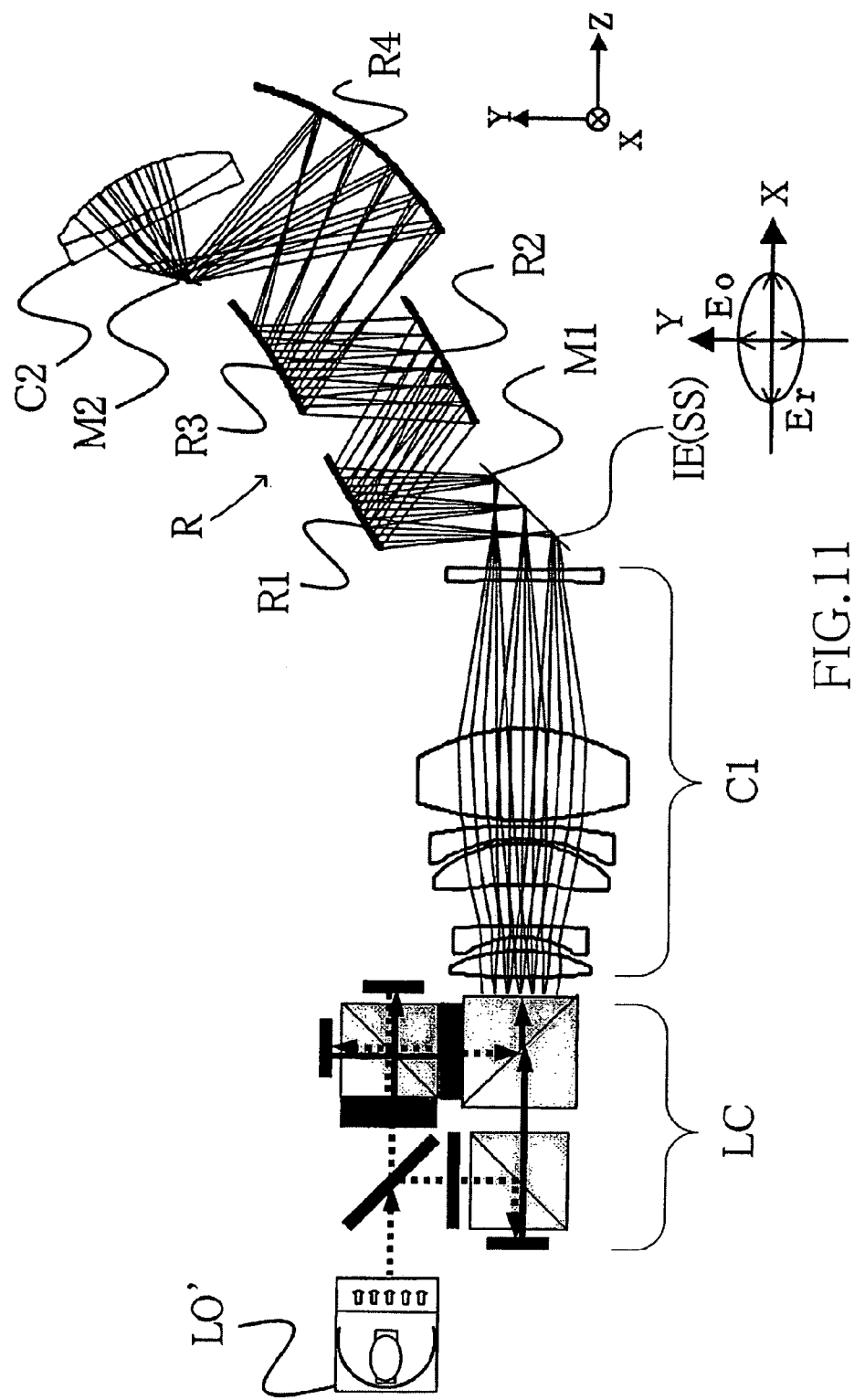
FIG. 11 is a cross-sectional view illustrating the structure of an image projection apparatus according to Embodiment 3 of the present invention.
Figure 12:
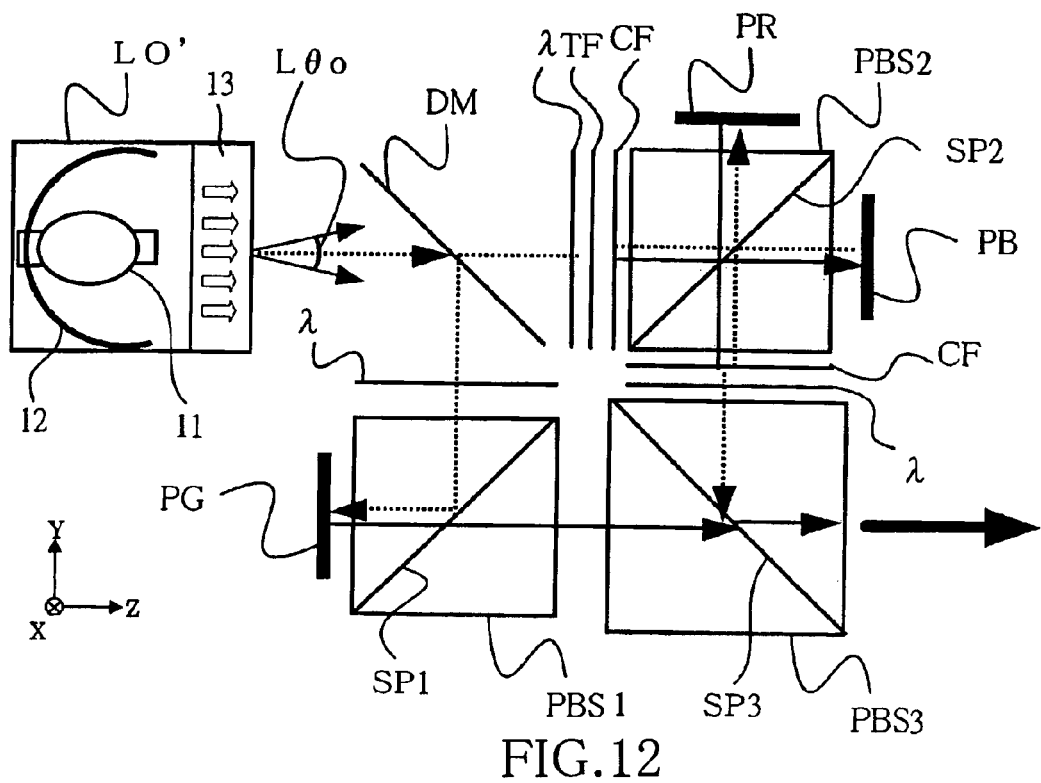
FIG. 12 shows the structure of an illumination system and a color separating/combining system in the image projection apparatus of Embodiment 3.

FIG. 11 is a cross-sectional view showing the structure of an image projection apparatus according to Embodiment 3 of the present invention. FIG. 12 shows the structure of an illumination system LO' and a color separating/combining system LC, which are part of this image projection apparatus.

As shown in FIG. 12, the illumination system LO' includes a lamp 11 which is a white light source, a reflective mirror 12, and a polarization converting element 13. Moreover, the color separating/combining system LC includes three reflective liquid crystal panels PR, PG and PB for red, green and blue, a dichroic mirror DM and three polarization beam splitters PBS1, PBS2 and PBS3 for color separation of light from the illumination system LO' and guiding the color light components to the liquid crystal panels PR, PG and PB, respectively, as well as color combination of the color light components coming from the liquid crystal panels PR, PG and PB, a wave plate λ, a trimming filter TF, and a color filter CF such as "Color Select" (registered trademark) sold by Color Link Co.

Although not shown in the figures, the reflective liquid crystal panels PR, PG and PB are connected to a driver circuit, like the image projection apparatus in FIG. 10, and an image information supplying apparatus 20 is connected to the driver circuit.

In FIG. 11, C1 denotes a first refractive optical unit (lens unit) serving as a zoomable coaxial optical system. M1 and M2 denote planar mirrors. R denotes an off-axial reflective optical unit constituted by a plurality of curved and rotationally asymmetric reflective surfaces R1 to R4. The off-axial reflective optical unit R has the same structure as explained in Embodiments 1 and 2. C2 denotes a second refractive optical unit (lens unit) serving as a coaxial optical system. The first refractive optical unit C1, the mirrors M1 and M2, the reflective optical unit R and the second refractive optical unit C2 constitute a projection optical system (image-formation optical system). Moreover, the YZ-plane in the figure is the off-axial sectional plane of the reflective optical unit R.

As shown in FIG. 12, white light is emitted by the light source lamp 11, the polarization direction of the white light is aligned by the polarization converting element 13, and then the white light is emitted from the illumination system LO'. The green light component of the white light is reflected by the dichroic mirror DM, whereas other color light components are transmitted by the dichroic mirror DM. The polarization direction of the green light component is rotated 90° by the wave plate λ, and the green light component is then incident on the polarization beam splitter PBS1. The green light component incident on the polarization beam splitter PBS1 is reflected by a polarization splitting film SP1 provided on the polarization beam splitter PBS1, and incident on a reflective liquid crystal panel PG for the color green. Then, after being modulated and reflected by the reflective liquid crystal panel PG, the green light component is transmitted by the polarization splitting film SP1 and travels toward the polarization beam splitter PBS3.

On the other hand, the light which has passed through the dichroic mirror DM passes through the wave plate λ, the trimming filter TF and the color filter CF, and is incident on the polarization beam splitter PBS2. Of the light incident on the polarization beam splitter PBS2, the red light component is reflected by a polarization splitting film SP2 provided on the polarization beam splitter PBS2, and incident on the reflective liquid crystal panel PR for red. Then, after being modulated and reflected by the reflective liquid crystal panel PR, the red light component is transmitted by the polarization splitting film SP2 and travels toward the polarization beam splitter PBS3.

Moreover, of the light incident on the polarization beam splitter PBS2, the blue light component is transmitted by the polarization splitting film SP2, and is incident on the reflective liquid crystal panel PB for blue. Then, after being modulated and reflected by the reflective liquid crystal panel PB, the blue light component is reflected by the polarization splitting film SP2 and travels toward the polarization beam splitter PBS3.

The green light component coming from the polarization beam splitter PBS1 and incident on the polarization beam splitter PBS3 is transmitted by a polarization splitting film SP3 provided on the polarization beam splitter PBS3. Moreover, the red and blue light components coming from the polarization beam splitter PBS2 and incident on the polarization beam splitter PBS3 via the color filter CF and the wave plate λ are reflected by the polarization splitting film SP3. Thus, the modulated light components of the three colors are combined, and this combined light is incident on the projection optical system, and magnified and projected onto a screen serving as a projection surface (not shown in the drawings).

Here, as shown in FIG. 11, the polarization splitting films SP1 to SP3 constituting the polarization splitting surfaces of the polarization beam splitters PBS1 to PBS3 are arranged such that they intersect substantially at a right angle with the off-axial sectional plane in the reference axial coordinate system.

When $L\theta o$ represents the divergent angle within the off-axial sectional plane of the light flux emerging from the illumination system LO', and $L\theta r$ represents the divergent angle in the direction perpendicular to the off-axial sectional plane, then $L\theta r$ is larger than $L\theta o$. Regarding the fact that the off-axial sectional plane and the polarization splitting surfaces are perpendicular (intersect at a right angle), FIG. 11 indicates a perpendicular relation also at the absolute coordinate system (X, Y, Z) in the figure, but it is basically sufficient if there is a perpendicular relation in the reference axial coordinate system.

The reason for this is that if the reference axis is bent, for example by the mirrors, in a direction perpendicular to the paper plane of FIG. 11 (direction perpendicular to the off-axial sectional plane), then the off-axial sectional plane and the polarization splitting surfaces are not perpendicular in the absolute coordinate system, but their perpendicular relation is still maintained for the reference axial coordinate system, so that the positional relation describe above among the polarization splitting surfaces, the aperture stop SS (entrance pupil IE of the reflective optical unit R) and the off-axial sectional plane is kept, and the same effect can be attained.

Consequently, since the off-axial sectional plane in the off-axial reflective optical unit R in FIG. 11 is the YZ-plane of the reference axial coordinate system, it is sufficient that the polarization splitting surfaces are perpendicular to the YZ-plane in the reference axial coordinate system, even when the reference axial coordinate system changes within the optical path from the polarization splitting surfaces to the off-axial reflective optical unit R.

Figure 13:
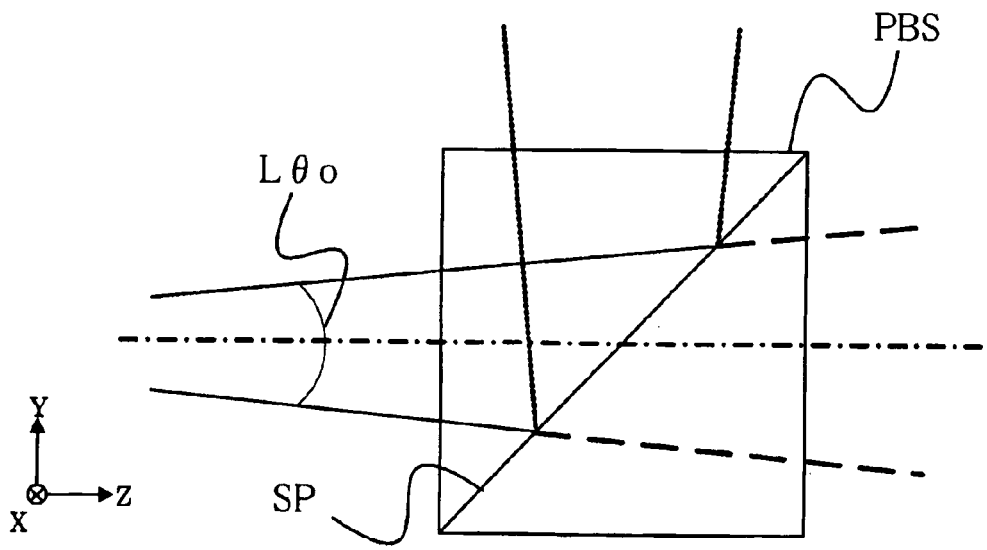
FIG. 13 is a schematic diagram of the color separating/combining system of Embodiment 3.
Figure 14:
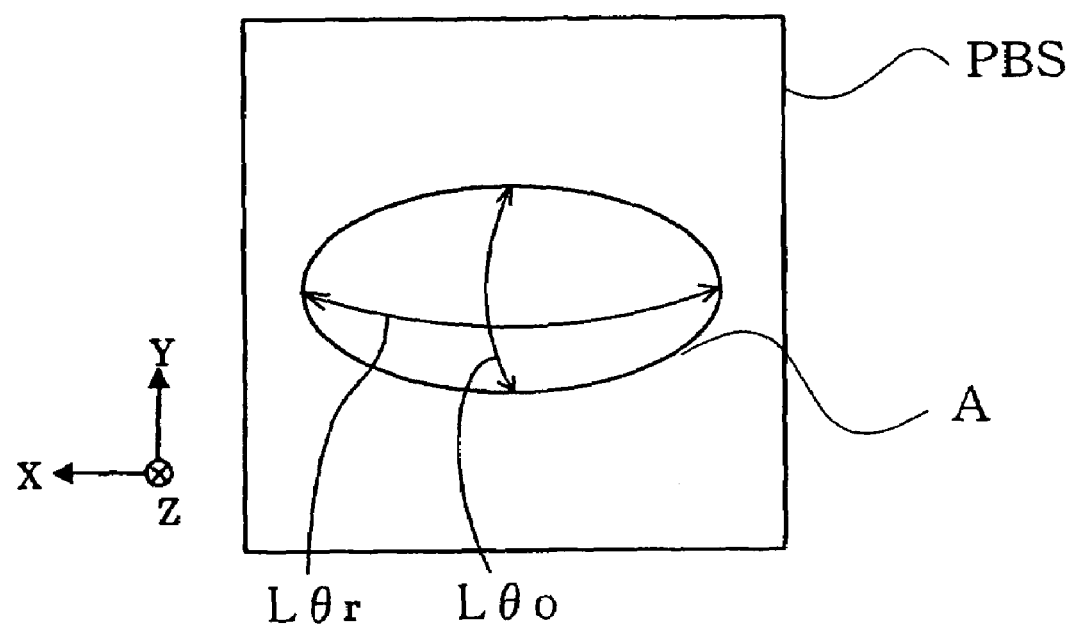
FIG. 14 is a schematic diagram of a beam entrance region in the color separating/combining system of Embodiment 3.

FIG. 13 and FIG. 14 show the relation between $L\theta r$ and $L\theta o$. FIG. 13 shows an exemplary PBS of the three polarization beam splitters PBS1 to PBS3 in FIGS. 11 and 12. FIG. 14 shows a region A on an incident surface of the polarization beam splitter PBS through which the light flux is transmitted. This region A is determined by the asymmetry of the divergent angles of the light flux incident on this polarization beam splitter PBS. The first refractive optical unit C1 in FIG. 11 is a rotationally symmetric system, so that as the entrance pupil diameters of the off-axial reflective optical unit R are concerned, the entrance pupil diameter Er in the direction perpendicular to the off-axial sectional plane becomes larger than the entrance pupil diameter Eo in the direction parallel to the off-axial sectional plane.

By arranging the projection optical system including the illumination system LO', the panels and color separating/combining system LC and the off-axial reflective optical unit R in the manner shown in FIG. 11, it is possible to realize an image projection apparatus having the same action and effect as explained in Embodiments 1 and 2.

On the other hand, by adopting this structure, the range from the maximum incident angle to the minimum incident angle of the light flux incident on the polarization splitting surfaces of the polarization beam splitters when splitting the colors, is narrowed down. Consequently, there is also the effect that the influence of angular dependencies of the polarization splitting surfaces can be reduced.

It should be noted that it is a main aspect of the present invention that the entrance pupil diameters of the off-axial reflective optical unit are made asymmetric by the asymmetry of the divergent angles of the light flux from the illumination system, and the above-described effects are attained in particular by arranging them such that the entrance pupil diameter in the direction parallel to the off-axial sectional plane is smaller than the entrance pupil diameter in the direction perpendicular to the off-axial sectional plane. Thus, the details regarding the various filters, liquid crystal panels and the projection optical system in the present embodiment may be modified, and are not limited to the present embodiment.

Embodiment 4

Figure 15:
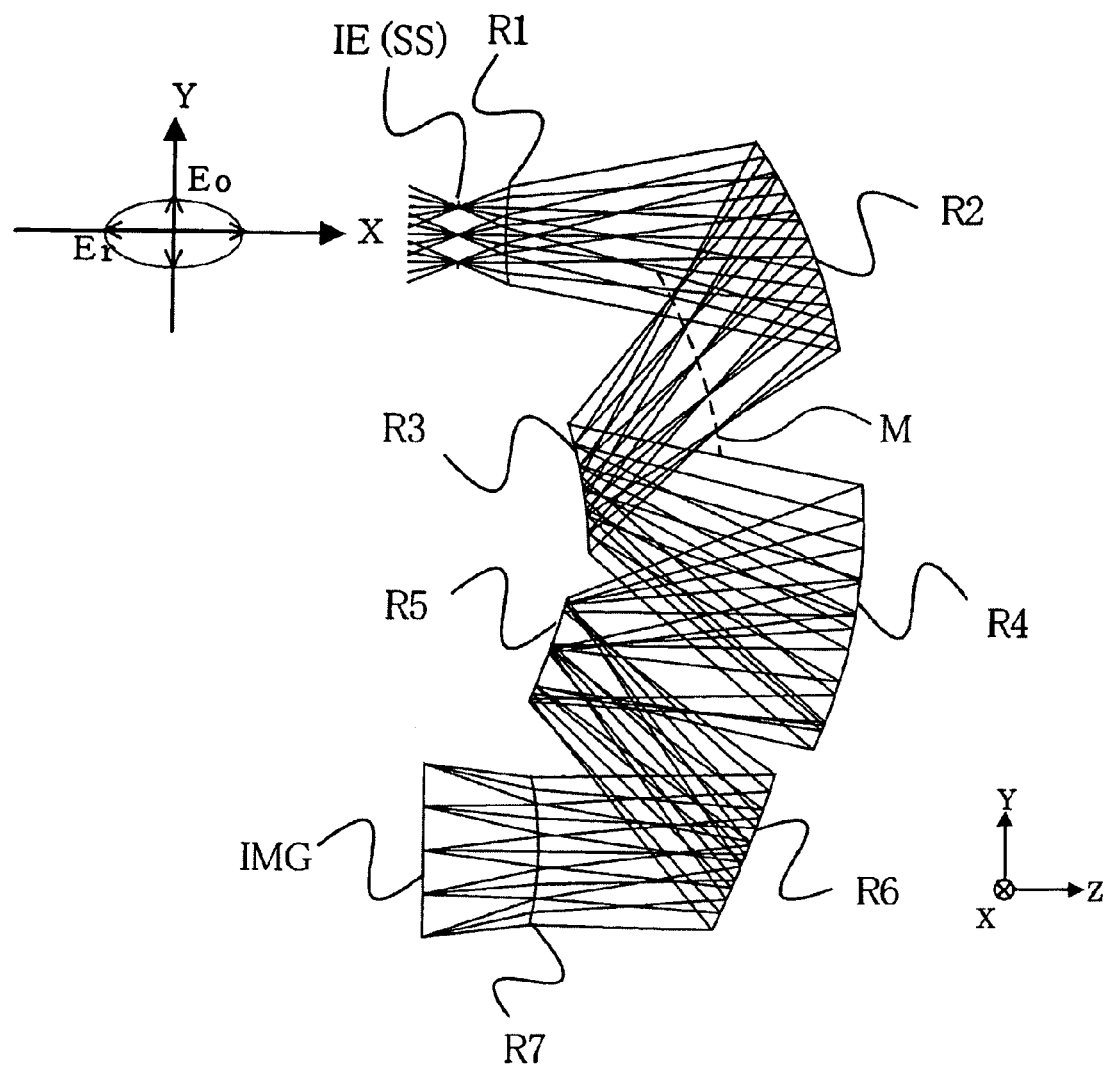
FIG. 15 is a cross-sectional view illustrating the structure of an image-formation optical system according to Embodiment 4 of the present invention.

FIG. 15 is a cross-sectional view showing the structure of an image-formation optical system according to Embodiment 4 of the present invention. The image-formation optical system of this embodiment is an image-taking optical system used for an image-taking apparatus such as a digital camera or video camera as shown in FIG. 21.

Figure 21:
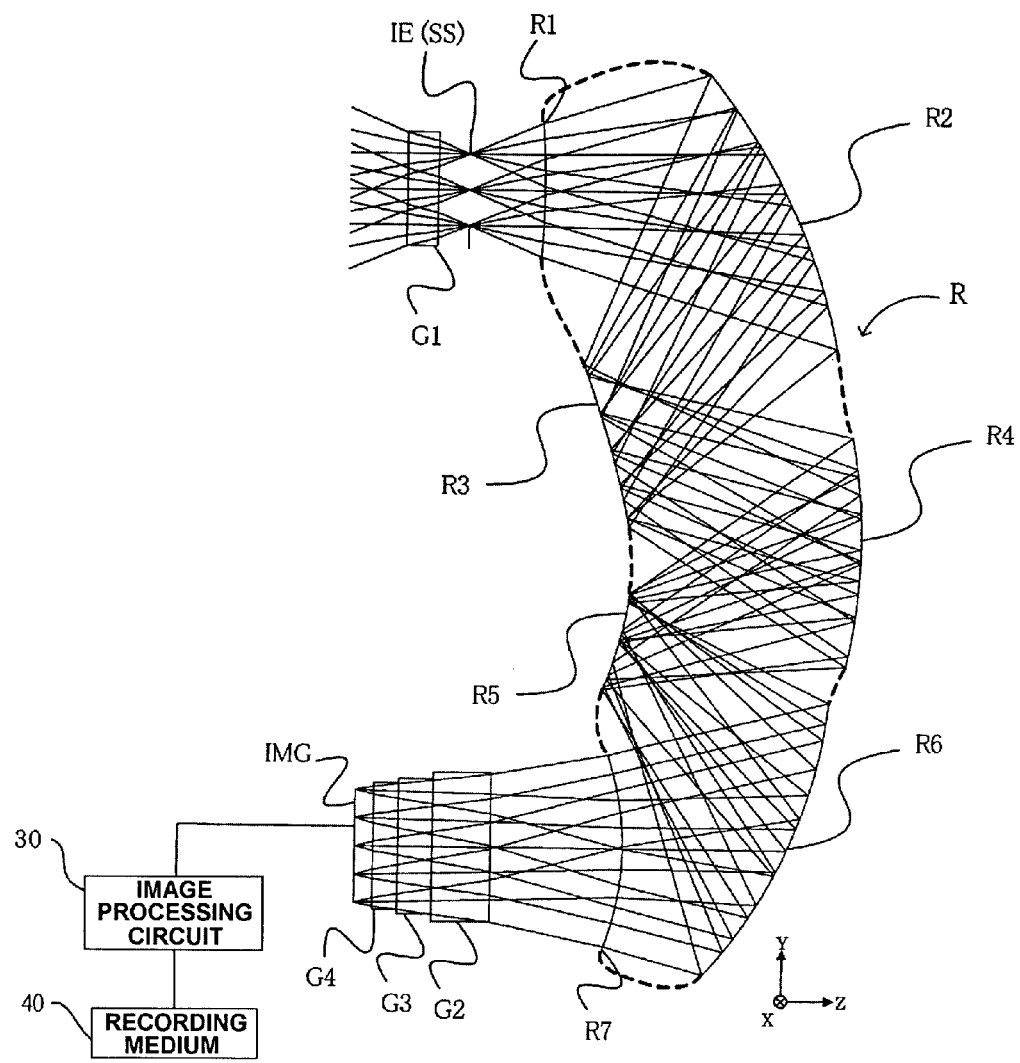
FIG. 21 is a cross-sectional view illustrating the structure of an image-taking apparatus using the image-formation optical system of Embodiment 5.

In FIG. 21, G1 to G4 denote optical filters, such as a cover glass, a low-pass filter and an infrared cut filter, which can be freely inserted or removed in accordance with the intended purpose. IE denotes an entrance pupil, and an aperture stop SS is provided at the position of this entrance pupil IE.

R denotes an off-axial reflective optical unit, integrally formed on a transparent material, such as glass or plastic, and having transmissive surfaces R1 and R7 and reflective surfaces R2 to R6. Light rays from an object, not shown in the figures, which are incident on the transmissive surface R1 are repeatedly refracted and reflected and form an image on an image-pickup element (photoelectric conversion element) IMG constituted by a CCD sensor or a CMOS sensor. An image processing circuit 30 generates images based on the signals from the image-pickup element IMG, and these image signals are recorded on a recording medium 40, such as a semiconductor memory, an optical disk, or a magnetic disk or the like.

In FIG. 15, R1 to R7 denote optical surfaces (transmissive surfaces and reflective surfaces) as noted above, and constitute an off-axial optical system in which the reference axis is bent. R1 and R7 are rotationally symmetric transmissive surfaces, and R2 to R6 are rotationally asymmetric reflective surfaces.

The shape of the entrance pupil IE in the XY-plane is shown in FIG. 15. When Eo represents the entrance pupil diameter of the reference axial light flux within the off-axial sectional plane (in the direction parallel to the off-axial sectional plane) and Er represents the entrance pupil diameter in the direction perpendicular to the off-axial sectional plane, with the off-axial sectional plane (the YZ-plane in FIG. 15) being the plane in which the reference axis is repeatedly reflected (the plane including the reference axis), then the following relation is given:

Er=2Eo

In other words, when θo is the divergent angle within the off-axial sectional plane of the reference axial light flux incident on the reflective optical unit R, and θr is the divergent angle in the direction perpendicular to the off-axial sectional plane, then the following relation is given:

θr=2θo

Furthermore, when Fo represents the F number within the off-axial sectional plane of the reflective optical unit R, and Fr represents the F number in the direction perpendicular to the off-axial sectional plane, then the following relation is given:

Fo=2Fr

Off-axial optical systems using these reflective surfaces R2 to R6 are often very sensitive to manufacturing discrepancies regarding surface precision and decentering and the like, which may cause problems during mass production. For example, when there are asymmetric discrepancies in the surface shapes, then a displacement of the focus position in two vertically intersecting directions on the image surface occurs across the entire image surface, that is, there is an astigmatic difference, and it is difficult to overcome this by mechanical adjustments.

However, with the projection optical system of the present embodiment, it is possible to avoid this problem for the reasons explained in Embodiment 1.

Table 1 shows the size of the off-axial reference axis angles at the reflective surfaces. Table 2 shows the equivalent optical path length L in air from the first reflective surface R2 in the reflective optical unit R, which is closest to the object side, to the final reflective surface R6, which is closest to the image surface, the optical path length L being normalized by the entrance pupil diameters Er and Eo and the number of reflective surfaces S, that is, L/{Er(S−1)} and L/Eo{(S−1)}.

For comparison, Tables 1 and 2 also show the off-axial reference axis angles and the values of L/Er{ (S−1)} and L/{Eo(S−1)} for the case of a reflective optical unit which differs from the reflective optical unit R in FIG. 15 only in that the entrance pupil diameters are symmetric (with the entrance pupil diameter being Er).

From these tables, it can be seen that by making the entrance pupil diameters asymmetric, the off-axial reference axis angles can be made smaller and the optical path length shorter than when the entrance pupil diameters are symmetric. Thus, a very compact image-taking optical system can be realized, in which the performance deterioration with respect to manufacturing discrepancies is small, as well as an image-taking apparatus using the same.

It should be noted that in the present embodiment, the object distance from the object surface to the aperture stop SS is 1000 mm, and the field angle is x: ±16.80° and y: ±21.93°. The focal length is x: −4.79 mm, y: −4.54 mm. The size of the image surface is 2.7 mm×3.6 mm.

The following shows the structural data of a reflective optical unit for a numerical example according to the present embodiment.

NUMERICAL EXAMPLE 4

Entrance pupil diameters of off-axial reflective optical unit: Eo: 1.125 mm; Er: 2.25 mm

| surf. | Yi | Zi | Di | θxb, i | Ndi | vdi |
|---|---|---|---|---|---|---|
| 1 (SS) | 0.00 | 0.00 | 1.00 | 0.00 | 1 | aperture stop |

-continued

| surf. | Yi | Zi | Di | θxb, i | Ndi | vdi | |
|---|---|---|---|---|---|---|---|
| 2 (R1) | 0.00 | 1.00 | 6.50 | 0.00 | 1.530410 | 55.5000 | refr. surf. |
| 3 (R2) | 0.00 | 7.50 | 7.00 | 23.51 | 1.530410 | 55.5000 | refl. surf. |
| 4 (R3) | −5.12 | 2.73 | 6.50 | −36.49 | 1.530410 | 55.5000 | refl. surf. |
| 5 (R4) | −7.97 | 8.57 | 6.50 | 15.00 | 1.530410 | 55.5000 | refl. surf. |
| 6 (R5) | −8.42 | 2.09 | 6.00 | −24.21 | 1.530410 | 55.5000 | refl. surf. |
| 7 (R6) | −12.62 | 6.38 | 4.50 | 22.19 | 1.530410 | 55.5000 | refl. surf. |
| 8 (R7) | −12.62 | 1.88 | 2.43 | 00.00 | 1 | | refr. surf. |
| 9 (IMG) | −12.62 | −0.56 | | 00.00 | 1 | | image surf. | aspherical surface shapes
surface 2 (R1)
  C02: 7.3834E-02 C04: 8.2890E-03 C06: −2.2221E-04
  C20: −2.9980E-03 C22: −2.1909E-04 C24: 1.4056E-04
  C40: −1.0466E-03 C42: 2.7753E-05 C60: −8.7098E-05
surface 3 (R2)
  C02: −4.9179E-02 C03: −8.4799E-04 C04: −1.9940E-06
  C05: 4.3332E-05 C06: 1.8364E-05 C20: −3.8688E-02
  C21: −1.4393E-04 C22: −2.9539E-04 C23: −7.9578E-06
  C24: −9.6657E-06 C40: −3.0674E-05 C41: 1.1740E-05
  C42: −7.5587E-06 C60: −1.5726E-06
surface 4 (R3)
  C02: −5.0901E-02 C03: −1.0718E-03 C04: −2.2174E-03
  C05: −1.9792E-04 C06: −5.7206E-05 C20: −4.6723E-02
  C21: 2.4797E-03 C22: −1.6520E-05 C23: −1.6080E-04
  C24: −4.3199E-05 C40: 4.0124E-04 C41: 2.7823E-04
  C42: 3.8308E-05 C60: −1.9330E-05
surface 5 (R4)
  C02: −4.6798E-02 C03: 9.4527E-05 C04: −1.8155E-04
  C05: 1.7734E-06 C06: −1.3209E-06 C20: −5.0470E-02
  C21: 3.4349E-04 C22: −2.8884E-04 C23: 6.5382E-07
  C24: −3.9186E-06 C40: −1.5488E-04 C41: −1.5065E-07
  C42: −4.2926E-06 C60: −1.6584E-06
surface 6 (R5)
  C02: −2.5160E-02 C03: 9.7515E-04 C04: −1.1549E-03
  C05: 1.7757E-04 C06: −7.3176E-05 C20: −3.9586E-02
  C21: 2.9549E-03 C22: −1.7270E-03 C23: 8.3151E-05
  C24: −8.1969E-05 C40: −1.0757E-03 C41: −2.0932E-06
  C42: −3.9360E-05 C60: −1.9204E-06
surface 7 (R6)
  C02: −2.0317E-02 C03: −2.2958E-03 C04: −8.2162E-06
  C05: 9.0597E-05 C06: −6.6119E-07 C20: −4.7578E-02
  C21: −5.6218E-04 C22: −1.3105E-04 C23: 3.7234E-05
  C24: −1.2662E-05 C40: −1.8410E-04 C41: 9.5734E-06
  C42: −1.8953E-05 C60: −6.7318E-06
surface 8 (R7)
  C02: −6.0301E-02 C04: −3.0490E-03 C06: −8.1446E-04
  C20: 4.3839E-02 C22: −3.3330E-03 C24: −1.3495E-03
  C40: −4.4809E-04 C42: −7.1140E-04 C60: −1.4582E-04

Figure 16:
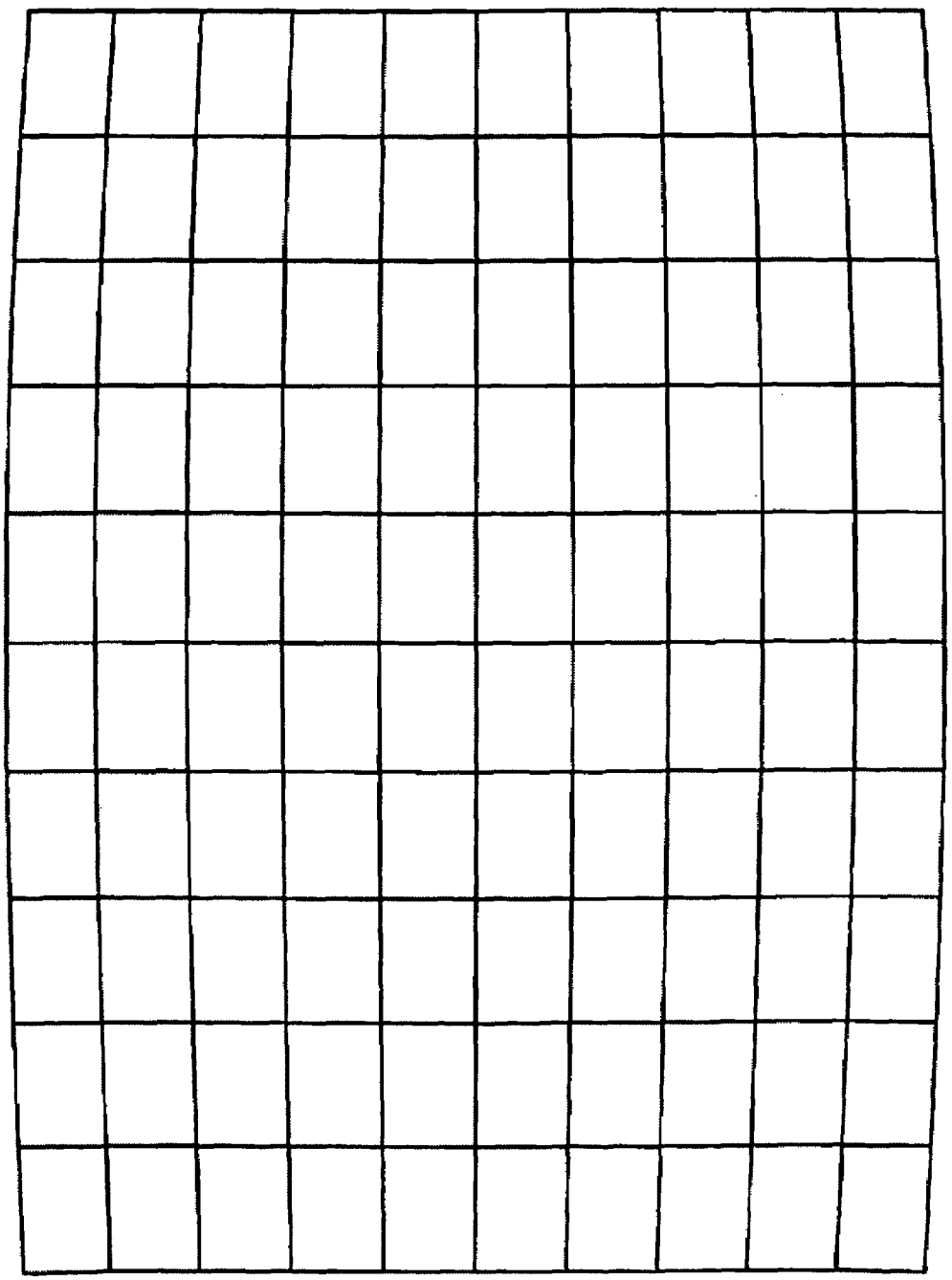
FIG. 16 illustrates the distortion in the image-formation optical system of Embodiment 4.
Figure 17:
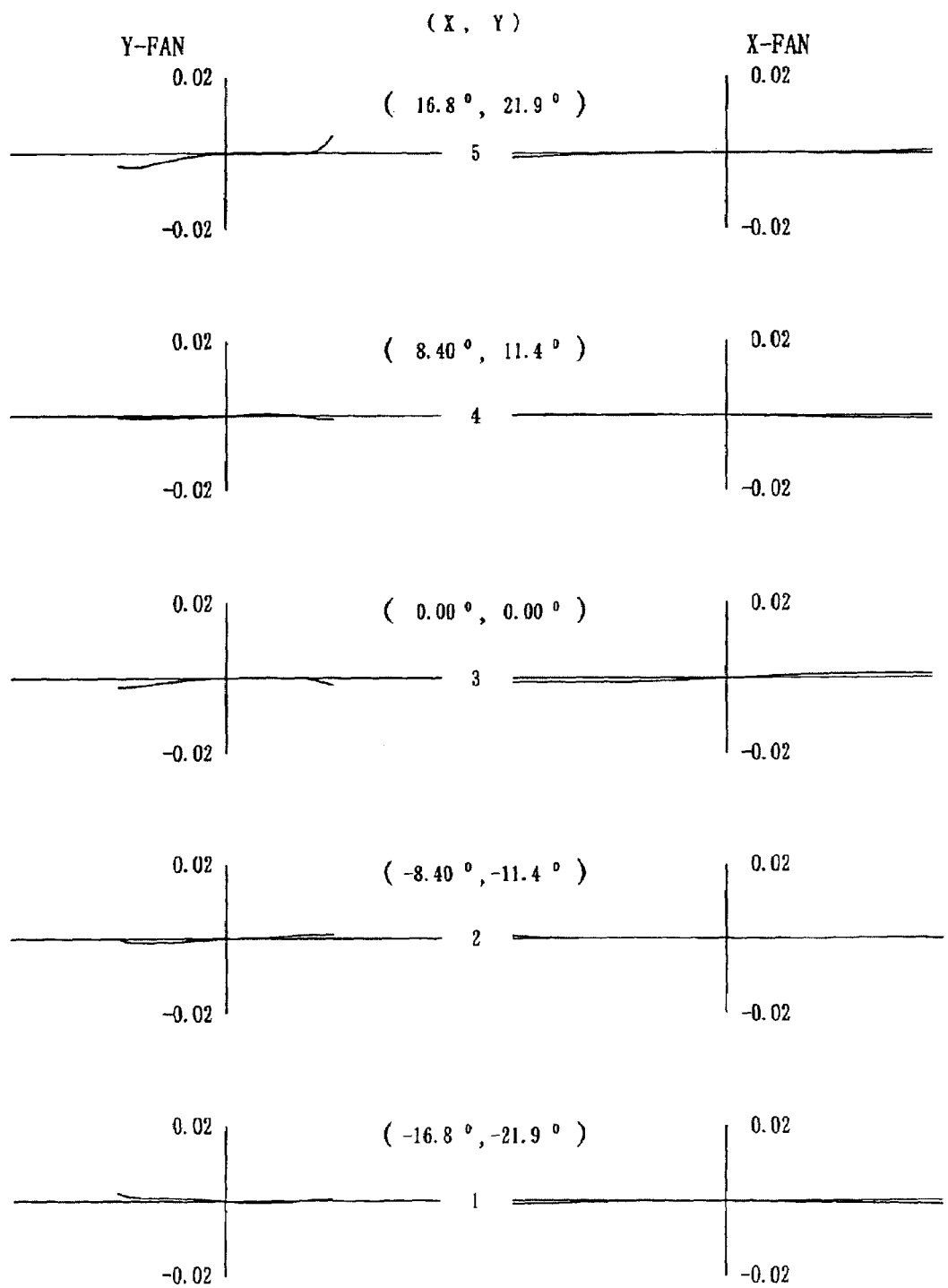
FIG. 17 shows transverse aberration charts for the image-formation optical system of Embodiment 4.
Figure 22:
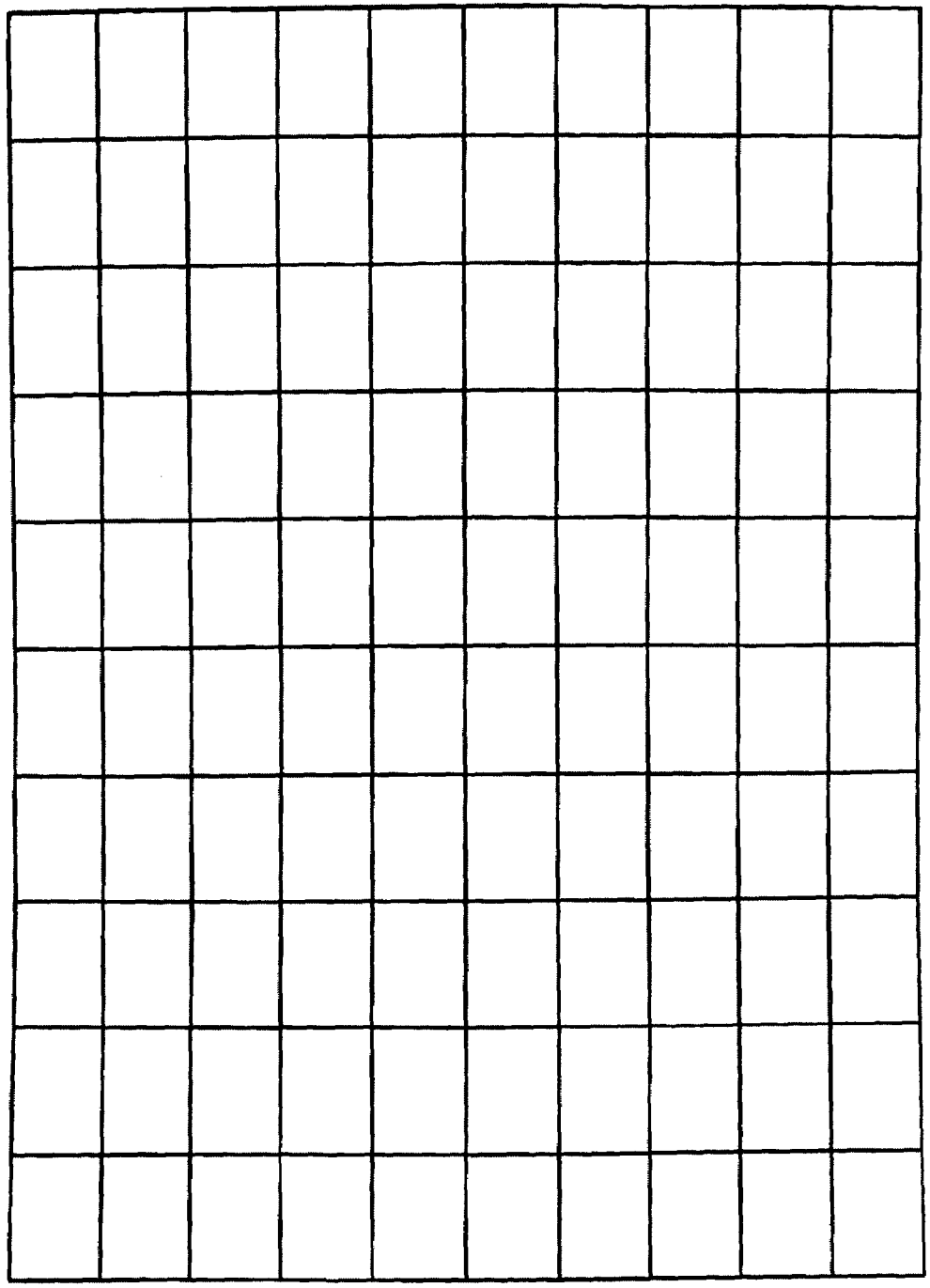
FIG. 22 illustrates the distortion in a conventional image-formation optical system.
Figure 23:
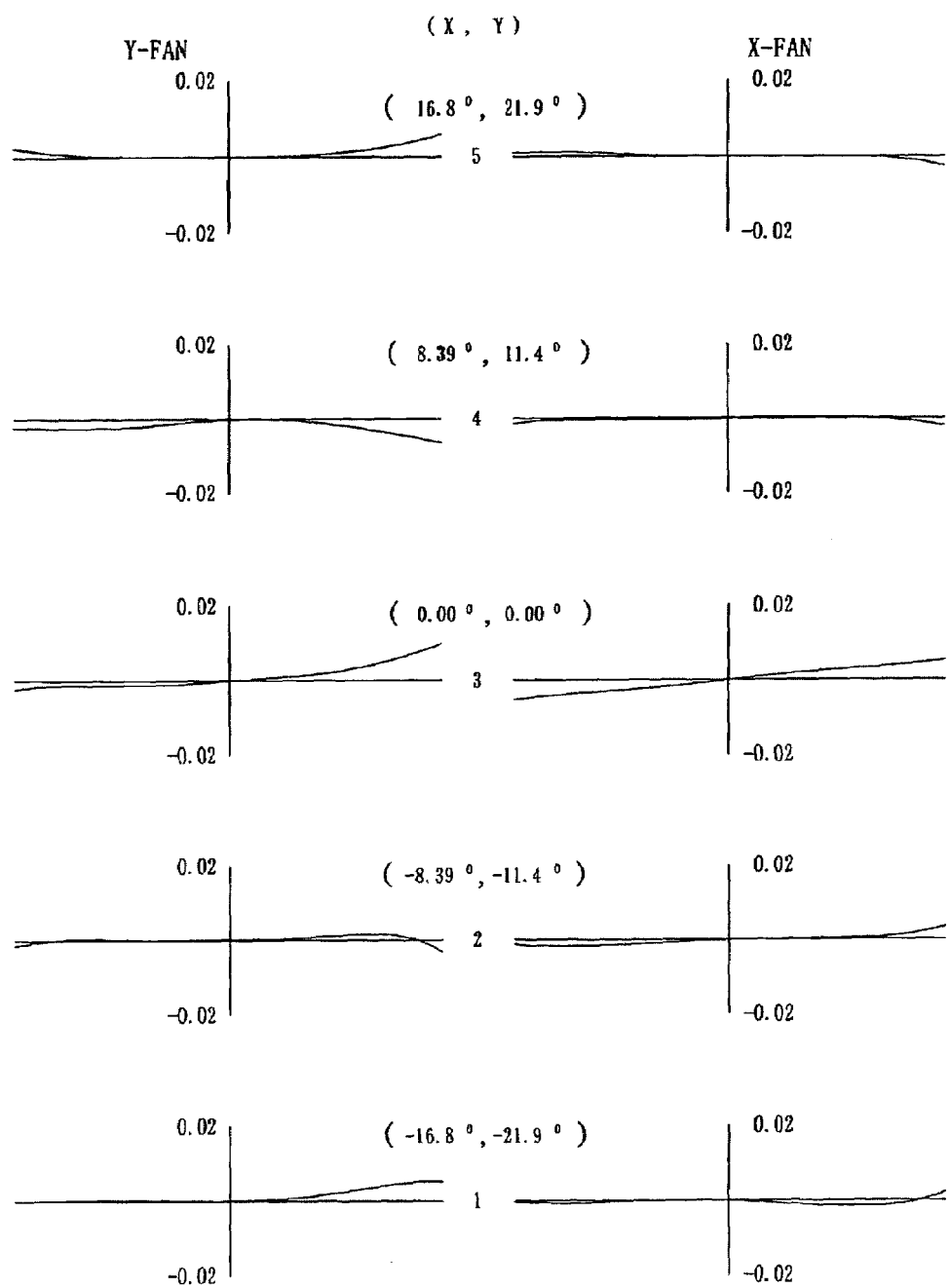
FIG. 23 shows transverse aberration charts for the conventional image-formation optical system.

FIG. 16 illustrates the distortion of the present embodiment, and FIG. 17 shows transverse aberration charts at the evaluation positions 1 to 5 marked by the circled numbers on the image surface IMG in FIG. 26. It can be seen from FIG. 16, that there are no large distortions in the image-taking optical system and also that the asymmetric distortion is small. In the transverse aberration charts in FIG. 17, the horizontal axis marks the X axis or the Y axis on the pupil plane, and the vertical axis marks the aberration amount on the image surface. The wavelength of the evaluation light rays is 550 nm. From FIG. 17, it can be seen that excellent image formation is attained for both the X-axis direction and the Y-axis direction. For comparison, FIG. 22 shows the distortion of an image-taking optical system in which the entrance pupil diameters are symmetric, and FIG. 23 shows the transverse aberration charts for the same evaluation positions. As can be seen by a comparison of FIG. 22 and FIG. 23, an excellent optical performance is also attained with the present embodiment.

Embodiment 5

Figure 18:
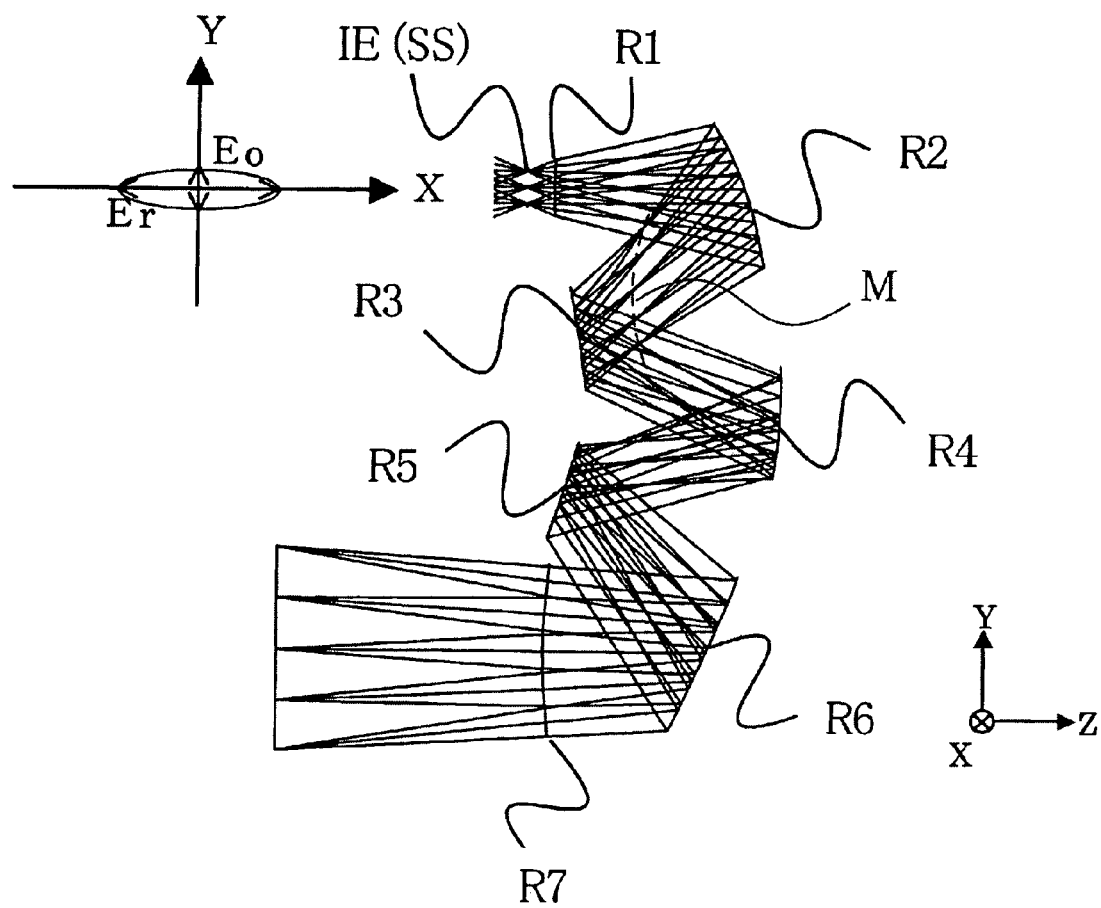
FIG. 18 is a cross-sectional view illustrating the structure of an image-formation optical system according to Embodiment 5 of the present invention.

FIG. 18 is a cross-sectional view showing the structure of an image-taking optical system (image-formation optical system) according to Embodiment 5 of the present invention. The image-taking optical system of this embodiment has a similar structure as the image-taking optical system of Embodiment 4 shown in FIG. 15, but differs in that the relation between the entrance pupil diameters is Er=4Eo.

Table 1 shows the size of the off-axial reference axis angles of the present embodiment. Table 2 shows the equivalent optical path length L in air from the first reflective surface R2 to the final reflective surface R6, normalized by the entrance pupil diameters Er and Eo and the number of reflective surfaces S.

By making the ratio between the asymmetric entrance pupil diameters larger, the off-axial reference axis angles can be made smaller and the optical path length can be made shorter than in Embodiment 4. Thus, a very compact image-taking optical system can be realized, in which the performance deterioration with respect to manufacturing discrepancies is small, as well as an image-taking apparatus using the same.

It should be noted that in the present embodiment, the object distance from the object surface to the aperture stop SS is 1000 mm. The field angle is x: ±16.80° and y: ±21.93°. The focal length is x: −4.59 mm, y: −4.52 mm. The size of the image surface is 2.7 mm×3.6 mm.

The following shows the structural data of a reflective optical unit for a numerical example according to the present embodiment.

NUMERICAL EXAMPLE 5

Entrance pupil diameters of off-axial reflective optical unit: Eo: 0.5625 mm; Er: 2.25 mm

| surf. | Yi | Zi | Di | θxb, i | Ndi | vdi | |
|---|---|---|---|---|---|---|---|
| 1 (SS) | 0.00 | 0.00 | 0.50 | 0.00 | 1 | | aperture stop |
| 2 (R1) | 0.00 | 0.50 | 3.50 | 0.00 | 1.530410 | 55.5000 | refr. surf. |
| 3 (R2) | 0.00 | 4.00 | 4.00 | 20.54 | 1.530410 | 55.5000 | refl. surf. |
| 4 (R3) | −2.63 | 0.98 | 4.00 | −36.49 | 1.530410 | 55.5000 | refl. surf. |
| 5 (R4) | −4.12 | 4.70 | 4.00 | 15.00 | 1.530410 | 55.5000 | refl. surf. |
| 6 (R5) | −5.09 | 0.82 | 4.00 | −24.21 | 1.530410 | 55.5000 | refl. surf. |
| 7 (R6) | −8.16 | 3.39 | 3.00 | 22.19 | 1.530410 | 55.5000 | refl. surf. |
| 8 (R7) | −8.16 | 0.39 | 4.91 | 00.00 | 1 | | refr. surf. |

-continued

| surf. | Yi | Zi | Di | θxb, i | Ndi | νdi |
|---|---|---|---|---|---|---|
| 9 (IMG) | −8.16 | −4.51 | 00.00 | | 1 | image surf. | aspherical surface shapes
surface 2 (R1)
  C02: 7.4157E-02 C04: −2.6406E-02 C06: 7.4282E-03
  C20: 4.5492E-02 C22: 6.2179E-03 C24: −7.5080E-03
  C40: 3.8284E-03 C42: 1.8029E-03 C60: −3.5711E-04
surface 3 (R2)
  C02: −7.5000E-02 C03: −6.5903E-03 C04: −3.9679E-03
  C05: 2.7355E-04 C06: 5.9804E-04 C20: −5.1119E-02
  C21: 6.7277E-03 C22: 4.3932E-03 C23: 6.0264E-04
  C24: 1.0961E-07 C40: 7.2899E-04 C41: −2.5603E-04
  C42: −2.4049E-04 C60: −4.1259E-05
surface 4 (R3)
  C02: −1.4528E-02 C03: −1.8996E-03 C04: −7.6474E-04
  C05: −9.2529E-04 C06: −6.7299E-04 C20: −4.8410E-02
  C21: 6.2769E-04 C22: 5.2285E-04 C23: −8.2181E-04
  C24: −1.8281E-04 C40: −2.3298E-03 C41: −4.0312E-04
  C42: 1.1398E-03 C60: −6.5743E-04
surface 5 (R4)
  C02: −5.9767E-02 C03: −4.5045E-04 C04: −5.4766E-04
  C05: −7.7316E-06 C06: 7.4592E-06 C20: −7.4774E-02
  C21: 1.7832E-03 C22: −8.4390E-04 C23: −1.2937E-06
  C24: −1.9115E-05 C40: −8.3465E-04 C41: 4.6856E-06
  C42: −2.4736E-05 C60: −1.4092E-05
surface 6 (R5)
  C02: −1.6446E-02 C03: 1.8073E-04 C04: −1.0377E-03
  C05: 1.0306E-04 C06: −1.1044E-04 C20: −7.5000E-02
  C21: 1.5627E-02 C22: −5.9695E-03 C23: 7.4043E-04
  C24: −4.9497E-04 C40: −5.5919E-03 C41: 3.2764E-03
  C42: −4.2575E-04 C60: −9.4428E-04
surface 7 (R6)
  C02: −1.3906E-02 C03: −4.3973E-03 C04: −6.2549E-04
  C05: 1.1125E-04 C06: −7.8622E-05 C20: −5.2599E-02
  C21: 4.1726E-03 C22: −2.2744E-04 C23: −4.1580E-05
  C24: −2.1938E-04 C40: 3.9094E-04 C41: −1.3277E-04
  C42: 2.4949E-04 C60: 2.6720E-06
surface 8 (R7)
  C02: 7.5000E-02 C04: −1.3451E-02 C06: 2.1452E-04
  C20: 7.5000E-02 C22: 1.3895E-02 C24: −9.5705E-04
  C40: 3.3842E-03 C42: −3.5249E-04 C60: −2.7690E-04

Figure 19:
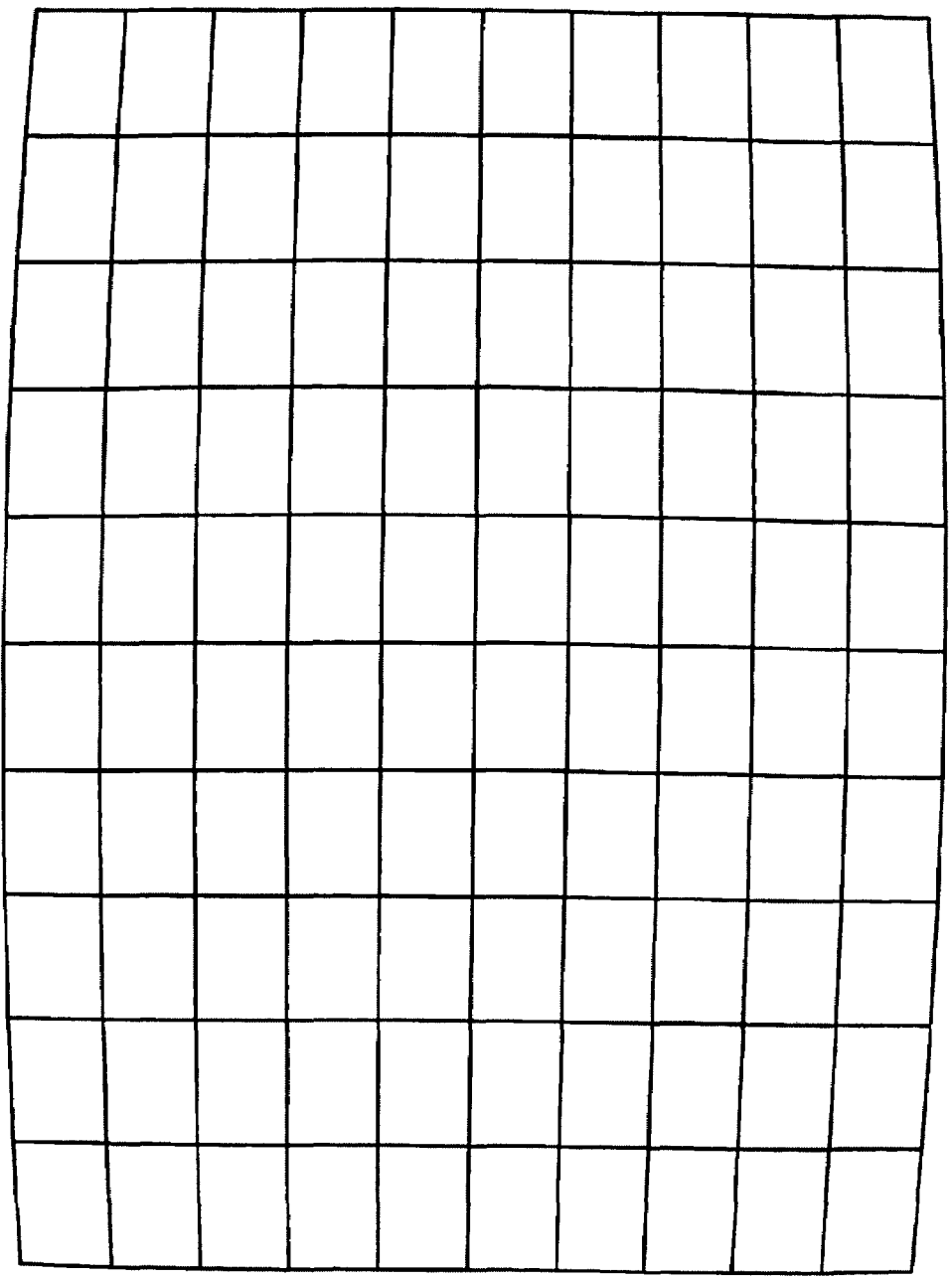
FIG. 19 illustrates the distortion in the image-formation optical system of Embodiment 5.
Figure 20:
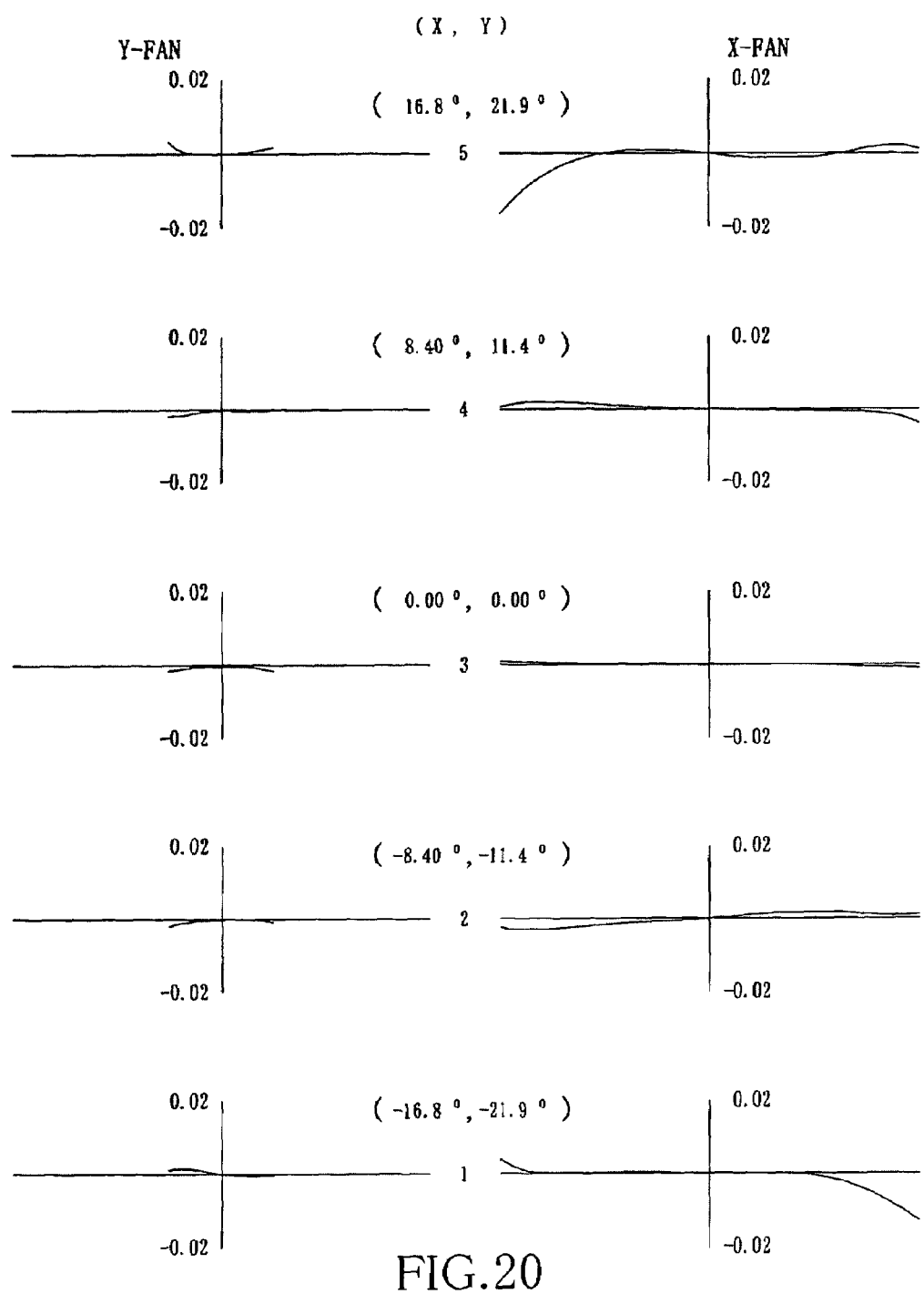
FIG. 20 shows transverse aberration charts for the image-formation optical system of Embodiment 5.

FIG. 19 illustrates the distortion of the present embodiment, and FIG. 20 shows transverse aberration charts at the evaluation positions 1 to 5 marked by the circled numbers on the image surface IMG in FIG. 26. It can be seen from FIG. 19, that there are no large distortions in the image-taking optical system and also that the asymmetric distortion is small. The meaning of the transverse aberration charts in FIG. 20 as well as the evaluation wavelength is the same as in Embodiment 5. From FIG. 20, it can be seen that excellent image formation is attained for both the X-axis direction and the Y-axis direction.

According to Table 2, the above-described embodiments satisfy:

$$L/\{Er(S-1)\} < 2.2 \qquad (1)$$

$$3 < L/\{Eo(S-1)\} \qquad (2)$$

Here, Expressions (1) and (2) represent conditions which should be satisfied by the off-axial reflective optical unit in order to make the performance deterioration with respect to manufacturing discrepancies small and to make the off-axial reflective optical unit sufficiently compact. The ranges (upper limit and lower limit) for $L/\{Er(S-1)\}$ and $L/\{Eo(S-1)\}$ differ due to the asymmetry of the entrance pupil diameters.

If the upper limit of Expression (1) is exceeded, then the optical path length becomes long, and the tolerances for manufacturing discrepancies become stricter. Ordinarily, when the distance between the optical surfaces is small, then the curvature radius becomes small, and the smaller the curvature radius is, the greater is the sensitivity to manufacturing discrepancies of the surface shapes. If the surface distances are decided in consideration of the sectional plane in which the smaller pupil diameter lies, then the surface distances for the sectional plane in which the larger pupil diameter lies become too short. Thus, by ensuring an optical path length which satisfies Expression (2), it is prevented that the curvature radius becomes small.

It should be noted that it is also possible to set the lower limit in Expression (1) to 1, 1.1 or 1.5. The same thing as for the Expression (2) can also be said for the lower limit of Expression (1), and for 1 or less, the surface distances become too short. Preferably, the lower limit is 1.1, more preferably 1.5.

Moreover, it is also possible to set the upper limit in Expression (2) to 5 or 6. The same thing as for the Expression (1) can also be said for the upper limit of Expression (2), and for 6 or more, the surface distances become too long. Preferably, the upper limit is 5.

Moreover, in the above embodiments, the following relations may be satisfied:

$$Er/Eo > 1.5 \qquad (3)$$

or $$\theta r/\theta o > 1.5$$

Moreover, when $\omega o$ represents the divergent angle of the axial light flux emerging from the image-formation optical system toward the image surface within the off-axial sectional plane (in the direction parallel to the off-axial sectional plane), fo represents the focal length of the image-formation optical system within the off-axial sectional plane, $\omega r$ represents the divergent angle of the axial light flux within the plane perpendicular to the off-axial sectional plane and including the principal ray of the axial light flux, and fr represents the focal length of the image-formation optical system within the plane perpendicular to the off-axial sectional plane, then the following relation may be satisfied:

$$(\omega r \cdot fo)/(\omega o \cdot fr) > 1.5 \qquad (5)$$

Table 3 shows the calculation results of Expression (5) for the various numerical examples.

This conditional expression is satisfied when the off-axial optical systems of Embodiments 1 and 2 are projecting obliquely to the projection surface, and for the case that the divergent angles of the emerging light flux are normalized by the focal length, since the focal lengths of the optical system are different for the two orthogonal directions (X-axis and Y-axis) perpendicular to the reference axis (Z-axis). By letting or and $\omega o$ satisfy this condition, it is possible to realize an optical system in which an image formed by it does not easily deteriorate even when there are manufacturing discrepancies, while maintaining the brightness at the image surface.

It should be noted that below the lower limit in Expression (5), the off-axial reference axis angle which is the angle defined by the reference axis on the incident side of a curved rotationally asymmetric reflective surface, and the reference axis on the emerging side after the reflection thereon cannot be made small and the optical path length cannot be made short.

It is preferable that the off-axial reference axis angle is equal to or less than 80°.

It was mentioned in Embodiment 1 that when the off-axial reference axis angle is small, then aberrations are reduced and that a small off-axial reference axis angle is also preferable with regard to reducing the influence of manufacturing discrepancies, but in practice, if air fills the space between surfaces, then a certain degree of the off-axial reference axis angle is necessary in order to ensure that the light incident on the surfaces R1 and R3, or on the surfaces R2 and R4 or the incident light from the aperture stop SS to the surface R1 as well as the light emerging from the surfaces R2, R3 and R4 in FIG. 7 is not subject to interference. Moreover, as shown in FIG. 21, if the optical element having the reflective surfaces is filled with glass or a plastic material or the like, then the optical element can be formed integrally, which is advantageous with regard such aspects as manufacturing costs or holding the element.

However, considering adjacent surfaces, such as the surfaces R2 and R4 for example, since the surfaces R2 and R4 each have a certain optical power, a level difference (step) may occur between them when being formed integrally, if the distance between them is small. Although it also depends on the material with which the optical element is filled, this level difference may lead to breakage of the element during forming, so that it is necessary to widen the distance and not to fabricate a sharp level difference. Consequently, a certain degree of the off-axial reference axis angle is necessary, and 80° may be given as a preferable upper limit.

Furthermore the above-described embodiments were explained for an image projection apparatus and an image-taking apparatus as an optical apparatus including an image-formation optical system including an off-axial reflective surface (reflective optical unit), but the image-formation optical system of the present invention is not limited to these kinds of apparatuses, and may also be applied to other kinds of optical apparatuses. For example, the present invention may also be used for a document-scanning device in a copying machine or an exposure apparatus exposing circuits on semiconductors, such as a stepper.

As explained above, with the above-described embodiments, it is possible to provide a reflective optical unit configured using off-axial reflective surfaces, and thus an image-formation optical system and an optical apparatus using the same, which are compact and have little performance deterioration with respect to manufacturing discrepancies.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

TABLE 1

|    | FIG. 7 (Er = Eo) | FIG. 1 (Er = 2Eo) | FIG. 4 (Er = 4Eo) | (Er = Eo) | FIG. 15 (Er = 2Eo) | FIG. 18 (Er = 4Eo) |
|----|------|------|------|------|------|------|
| R1 | 54.000 | 46.000 | 36.000 | 55.892 | 47.024 | 41.082 |
| R2 | 50.000 | 46.000 | 40.000 | 77.762 | 72.988 | 63.010 |
| R3 | 60.000 | 60.000 | 52.000 | 40.000 | 30.000 | 36.000 |
| R4 | 30.000 | 32.000 | 26.000 | 68.000 | 48.412 | 64.072 |
| R5 |        |        |        | 49.868 | 44.374 | 50.000 |

TABLE 2

|    | FIG. 7 (Er = Eo) | FIG. 1 (Er = 2Eo) | FIG. 4 (Er = 4Eo) | (Er = Eo) | FIG. 15 (Er = 2Eo) | FIG. 18 (Er = 4Eo) |
|----|------|------|------|------|------|------|
| $L/\{Er(S-1)\}$ | 2.444 | 1.775 | 1.198 | 2.604 | 1.888 | 1.162 |
| $L/\{Eo(S-1)\}$ | 2.444 | 3.550 | 4.792 | 2.604 | 3.776 | 4.648 |

TABLE 3

|    | FIG. 7 (Er = Eo) | FIG. 1 (Er = 2Eo) | FIG. 4 (Er = 4Eo) | (Er = Eo) | FIG. 15 (Er = 2Eo) | FIG. 18 (Er = 4Eo) |
|----|------|------|------|------|------|------|
| fo | 149.889 | 154.874 | 154.435 | 3.05897 | 4.5395 | 4.52107 |
| fr | 134.504 | 137.241 | 138.57 | 3.06048 | 4.79424 | 4.5902 |
| wo | 0.206364 | 0.116084 | 0.0535853 | 23.2567 | 14.2171 | 7.12114 |
| wr | 0.198237 | 0.231418 | 0.196634 | 26.5899 | 27.1059 | 28.2821 |
| Expression (5) | 1.07049 | 2.24967 | 4.08968 | 1.14276 | 1.80527 | 3.91175 |

What is claimed is:

1. An image-formation optical system comprising:
a reflective optical unit including a plurality of reflective surfaces, each of the reflective surfaces having a curvature and a rotationally asymmetric shape;
wherein the following conditions are satisfied:

$$L/\{Er(S-1)\} < 2.2$$

$$3 < L/\{Eo(S-1)\}$$

where L represents an equivalent optical path length in air on a reference axis between a first reflective surface of the reflective optical unit which is closest to an object and a final reflective surface of the reflective optical unit which is closest to an image surface, the reference axis representing a path traveled by a central principal ray passing through a center of a pupil and reaching a center of an image surface, Er represents a first diameter of an entrance pupil of the reflective optical unit in a first direction perpendicular to a first sectional plane including the reference axis, Eo represents a second diameter of the entrance pupil in a second direction parallel to the first sectional plane, the second diameter Eo being smaller than the first diameter Er, and S represents the number of surfaces from the first reflective surface to the final reflective surface.

2. The image-formation optical system according to claim 1, further satisfying the following condition:

$$(\omega r \cdot fo)/(\omega o \cdot fr) > 1.5$$

where ωo represents a first divergent angle of an axial light flux emerging from the image-formation optical system toward the image surface within the first sectional plane, fo represents a first focal length of the image-formation optical system within the first sectional plane, ωr represents a second divergent angle of the axial light flux within a second sectional plane perpendicular to the first sectional plane and including the central principal ray, and fr represents a second focal length of the image-formation optical system within the second sectional plane.

3. The image-formation optical system according to claim 1,
wherein an angle formed by the reference axis on an incident side of the first reflective surface and the reference axis on an emergent side after reflection by the first reflective surface is equal to 80° or less.

4. The image-formation optical system according to claim 1,
wherein the image-forming optical system forms an intermediate image within the image-formation optical system.

5. An optical apparatus comprising the image-formation optical system according to claim 1.

6. An image projection apparatus comprising:
an image-generating unit;
an image-formation optical system according to claim 1, which projects light from the image-generating unit.

7. An image projection apparatus comprising:
a plurality of image-generating elements, each of the image-generating elements forming an original image and modulating a light component of a different color;
a color combining element including a polarization splitting surface, which combines the color light components from the plurality of image-generating elements by transmitting or reflecting the color light components depending on their polarization direction; and
an image-formation optical system according to claim 1, which projects the light combined by the color combining element;
wherein the polarization splitting surface is substantially perpendicular to the first sectional plane.

8. An image-taking apparatus comprising:
the image-formation optical system according to claim 1; and
a photoelectric conversion element, which photoelectrically converts an image formed by the image-formation optical system.

* * * * *

UNITED STATES PATENT AND TRADEMARK OFFICE
CERTIFICATE OF CORRECTION

PATENT NO. : 7,016,124 B2  Page 1 of 1
APPLICATION NO. : 10/859805
DATED : March 21, 2006
INVENTOR(S) : Hatakeyama et al.

It is certified that error appears in the above-identified patent and that said Letters Patent is hereby corrected as shown below:

On the title page of the issued patent

In the References Cited Item (56), under the heading of FOREIGN PATENT DOCUMENTS, Please replace "JP 01-282451 10/1998" to

--JP 10-282451 10/1998--.

Signed and Sealed this

Tenth Day of April, 2007

JON W. DUDAS
*Director of the United States Patent and Trademark Office*